(12) United States Patent
Liu et al.

(10) Patent No.: US 11,791,472 B2
(45) Date of Patent: Oct. 17, 2023

(54) POSITIVE CURRENT COLLECTOR, SECONDARY BATTERY, AND ELECTRICAL DEVICE

(71) Applicant: CONTEMPORARY AMPEREX TECHNOLOGY CO., LIMITED, Ningde (CN)

(72) Inventors: Xin Liu, Ningde (CN); Qisen Huang, Ningde (CN); Mingling Li, Ningde (CN); Xianghui Liu, Ningde (CN); Jia Peng, Ningde (CN); Cheng Li, Ningde (CN); Meng Qin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/314,158

(22) Filed: May 9, 2023

(65) Prior Publication Data
US 2023/0282838 A1    Sep. 7, 2023

Related U.S. Application Data

(63) Continuation of application No. PCT/CN2021/115979, filed on Sep. 1, 2021.

(51) Int. Cl.
H01M 4/66    (2006.01)
(52) U.S. Cl.
CPC ........... *H01M 4/667* (2013.01); *H01M 4/661* (2013.01); *H01M 4/666* (2013.01)
(58) Field of Classification Search
CPC ...................................................... H01M 4/667
See application file for complete search history.

(56) References Cited

FOREIGN PATENT DOCUMENTS

| | | |
|---|---|---|
| CN | 110050370 A | 7/2019 |
| CN | 110943215 A | 3/2020 |
| CN | 213546523 U | 6/2021 |
| EP | 3467919 A1 | 4/2019 |

(Continued)

OTHER PUBLICATIONS

International Search Report and Written Opinion received in the corresponding International Application PCT/CN2021/115979, dated Mar. 30, 2022.

(Continued)

*Primary Examiner* — Stephan J Essex
(74) *Attorney, Agent, or Firm* — Kilpatrick Townsend & Stockton LLP

(57) ABSTRACT

A positive current collector, a secondary battery, and an electrical device are provided. In some embodiments, the positive current collector includes: a support layer; and a conductive layer located on at least one surface of the support layer, where the conductive layer includes a first metal portion configured to connect to a tab, where, along a thickness direction of the conductive layer, the first metal portion includes at least three sublayers, and melting points of the at least three sublayers rise stepwise in ascending order of distance from the support layer. In the embodiments of this application, the first metal portion includes at least three sublayers, and the melting points of the at least three sublayers rise stepwise in ascending order of distance from the support layer, thereby helping increase a bonding force between the conductive layer and the support layer and reducing the probability of peel-off and delamination between the layers.

19 Claims, 4 Drawing Sheets

(56) References Cited

FOREIGN PATENT DOCUMENTS

| | | |
|---|---|---|
| JP | 2014102954 A | 6/2014 |
| KR | 1020150001762 A | 1/2015 |
| KR | 102097444 B1 | 4/2020 |
| KR | 1020200099314 A | 8/2020 |

OTHER PUBLICATIONS

Decision on Registration received in the corresponding Korean application 10-2023-7002976, dated Jul. 28, 2023.

POSITIVE CURRENT COLLECTOR, SECONDARY BATTERY, AND ELECTRICAL DEVICE

CROSS-REFERENCE TO RELATED APPLICATIONS

The present application is a continuation of International Application PCT/CN2021/115979, filed Sep. 1, 2021 and entitled "POSITIVE CURRENT COLLECTOR, SECONDARY BATTERY, AND ELECTRICAL DEVICE", which is incorporated herein by reference in its entirety.

TECHNICAL FIELD

This application relates to the technical field of batteries, and in particular, to a positive current collector, a secondary battery, and an electrical device.

BACKGROUND

A secondary battery is widely applied in electric vehicles and consumer electronic products by virtue of advantages such as a high energy density, a high output power, a long cycle life, and little environmental pollution. As an important part of the secondary battery, a current collector not only provides support for an active material layer, but also collects electrical current generated by the active material layer so that the current can be output outward. Therefore, the current collector exerts significant leverage on the performance of electrode plates, the secondary battery, and the like. Currently, a composite current collector with a sandwich structure of "metal-insulating polymer-metal" is typically used to enhance performance of the secondary battery. However, defects such as a cold solder joint are prone to occur at an existing weld between the composite current collector and a tab, thereby leading to a high defect rate of welding. Therefore, the existing composite current collector still needs to be improved.

SUMMARY

In view of the problem above, this application aims to provide a positive current collector, a secondary battery, and an electrical device.

To achieve the foregoing objective, a first aspect of this application provides a positive current collector. The positive current collector includes: a support layer; and a conductive layer located on at least one surface of the support layer. The conductive layer includes a first metal portion. The first metal portion is configured to connect to a tab. Along a thickness direction of the conductive layer, the first metal portion includes at least three sublayers. Melting points of the at least three sublayers rise stepwise in ascending order of distance from the support layer.

Therefore, in embodiments of this application, the first metal portion includes at least three sublayers. The melting points of the at least three sublayers rise stepwise in ascending order of distance from the support layer. The melting point of the sublayer in contact with the support layer is closer to the melting point of the support layer. Therefore, in a process of compounding the conductive layer and the support layer, for example, by ultrasonic welding, the conductive layer and the sublayer penetrate each other more easily, and bond with each other more firmly after cooling down, thereby helping increase a bonding force between the conductive layer and the support layer and effectively preventing delamination and peel-off between the conductive layer and the support layer. Moreover, the melting point of a sublayer most distant from the support layer is relatively high, so that the probability of adhesion between the sublayer and a welding device is reduced, and consistency of welding is improved. In addition, the sublayer in the middle can penetrate and fuse with adjacent sublayers mutually, thereby effectively preventing poor welding caused by an excessive difference of the melting point between the sublayer in contact with the support layer and the sublayer most distant from the support layer, and increasing the bonding force between different sublayers.

In any embodiment, the first metal portion includes a metal matrix and a doping element. The metal matrix is selected from aluminum or an aluminum-based alloy. The doping element is one or more selected from beryllium, calcium, cadmium, cerium, indium, lanthanum, lithium, neodymium, nickel, palladium, praseodymium, samarium, tin, yttrium, ytterbium, zinc, gallium, germanium, silicon, samarium, uranium, magnesium, or copper.

Therefore, in embodiments of this application, through coordination between the doping element and the metal matrix, the melting point of the first metal portion can be significantly lowered, and the melting points of different sublayers of the first metal portion can be adjusted to change stepwise.

In any embodiment, based on a total mass percent W of the first metal portion being 100%, a mass percent $W_1$ of the doping element is 0.5% to 10%, and a mass percent $W_2$ of the metal matrix is 90% to 99.5%. Therefore, in embodiments of this application, by adding the doping element and the metal matrix at the foregoing mass percent, sufficient conductivity of the first metal portion and stability in an electrochemical environment can be ensured.

In any embodiment, the support layer includes one or more of a polymer material or a polymer-based composite material. The polymer material includes one or more of polyamide, polyimide, polyethylene terephthalate, polybutylene terephthalate, polyethylene naphthalate, polycarbonate, polyethylene, polypropylene, polyphenylene ether, poly(acrylonitrile-co-butadiene-co-styrene), polyvinyl alcohol, polystyrene, polyvinyl chloride, polyvinylidene difluoride, polytetrafluoroethylene, poly(sodium-p-styrene-sulfonate), polyacetylene, silicone rubber, polyoxymethylene, polyphenylene oxide, polyphenylene sulfide, polyethylene glycol, polythiaxyl, polyphenyl, polypyrrole, polyaniline, polythiophene, polypyridine, cellulose, starch, protein, epoxy resin, phenol resin, a derivative thereof, a crosslinked polymer thereof, or a copolymer thereof. The polymer-based composite material includes the polymer material and a metal material; and optionally, the metal material includes one or one of magnesium, calcium, strontium, lead, zinc, tin, antimony, bismuth, silver, or ruthenium. Therefore, in embodiments of this application, the support layer is small in thickness and light in weight, thereby significantly improving a volumetric energy density of the secondary battery.

In any embodiment, based on a total mass percent of the polymer-based composite material being 100%, a doping percent of the metal material is less than or equal to 10%, and optionally, the doping percent of the metal material falls within a range that is less than or equal to 5%.

Therefore, embodiments of this application can ensure a sufficient volumetric energy density of the secondary battery, and can also increase the bonding force between the support layer and the first metal portion.

In any embodiment, $D_{50}$ of the metal material is less than or equal to 5 μm, and optionally, $D_{50}$ of the metal material is 1 μm to 3 μm, where $D_{50}$ is a particle diameter measured when a cumulative volume percentage of the metal material reaches 50%, that is, a median diameter in a volume-based particle size distribution.

Therefore, the support layer formed by the polymer material and the metal material according to embodiments of this application is uniform in thickness.

In any embodiment, a ratio of a melting point of the first metal portion to a melting point of the support layer is $R_4$, $1.35 \leq R_4 \leq 10$; and optionally, $2.08 \leq R_4 \leq 3.88$. Therefore, in embodiments of this application, the melting point of the first metal portion is close to the melting point of the support layer, thereby increasing the bonding force between the first metal portion and the support layer.

In any embodiment, a melting point of the first metal portion is 540° C. to 650° C. Optionally, the melting point of the first metal portion is 540° C. to 620° C. In embodiments of this application, the melting point of the first metal portion is relatively low, thereby further increasing the bonding force between the first metal portion and the support layer.

In any embodiment, a melting point of the support layer is 65° C. to 400° C. Optionally, the melting point of the support layer is 160° C. to 260° C. In embodiments of this application, the melting point of the support layer is relatively high, thereby further increasing the bonding force between the first metal portion and the support layer.

In any embodiment, the conductive layer includes a second metal portion configured to connect to a positive active material layer, and a melting point of the second metal portion is 600° C. to 660° C.; and optionally, the melting point of the second metal portion is 620° C. to 660° C. The electrical conductivity of the second metal portion according to embodiments of this application is relatively high.

In any embodiment, a ratio of a thickness of the first metal portion to a thickness of the second metal portion is A, where $1.01 \leq A \leq 3$. The first metal portion falling within the foregoing range of the thickness ratio can improve the welding effect of the first metal portion, improve the flow capacity and mechanical durability, and facilitate integrated processing of the positive current collector.

In any embodiment, along the thickness direction of the conductive layer, the first metal portion includes a first sublayer, a second sublayer, and a third sublayer. The third sublayer is located on a surface of the support layer. The second sublayer is located on a side that is of the third sublayer and that is back from the support layer. The first sublayer is located on a side that is of the second sublayer and that is back from the support layer. The first sublayer includes a first metal matrix; and/or the second sublayer includes a second metal matrix and a second doping element; and/or the third sublayer includes a third metal matrix and a third doping element, where the first metal matrix, the second metal matrix, and the third metal matrix each are independently selected from aluminum or an aluminum-based alloy; and/or the second doping element and the third doping element each are one or more independently selected from beryllium, calcium, cadmium, cerium, indium, lanthanum, lithium, neodymium, nickel, palladium, praseodymium, samarium, tin, yttrium, ytterbium, zinc, gallium, germanium, silicon, samarium, uranium, magnesium, or copper.

Therefore, in embodiments of this application, the melting points of the first sublayer, the second sublayer, and the third sublayer show a tendency to change stepwise. When melting occurs, the second sublayer can penetrate and bond with the first sublayer and the third sublayer separately, so as to increase the bonding force between the layers and reduce the probability of peel-off and delamination between different sublayers inside the first metal portion.

In any embodiment, the first metal matrix is selected from aluminum.

In any embodiment, the second metal matrix is selected from aluminum, the second doping element is one or more selected from calcium, cerium, lanthanum, lithium, neodymium, nickel, palladium, praseodymium, samarium, yttrium, ytterbium, samarium, uranium, or copper, the second doping element is configured to form an intermetallic compound, and the second sublayer is doped with the intermetallic compound. In embodiments of this application, the doping element can form a nanometer-scale high-strength intermetallic compound phase in situ. The intermetallic compound phase is diffused in the second sublayer, thereby helping increase tensile strength of the second sublayer.

In any embodiment, the third metal matrix is selected from aluminum. The third doping element is one or more selected from calcium, cerium, lanthanum, lithium, neodymium, nickel, palladium, praseodymium, samarium, yttrium, ytterbium, samarium, uranium, or copper. The third doping element is configured to form an intermetallic compound, and the third sublayer is doped with the intermetallic compound. In embodiments of this application, the doping element can form a nanometer-scale high-strength intermetallic compound phase in situ. The intermetallic compound phase is diffused in the third sublayer, thereby helping increase tensile strength of the third sublayer.

In any embodiment, a ratio of a melting point of the first sublayer to a melting point of the second sublayer is $R_1$, where $1 < R_1 \leq 1.1$.

In any embodiment, a ratio of a melting point of the second sublayer to a melting point of the third sublayer is $R_2$, where $1 < R_2 \leq 1.2$.

In any embodiment, a ratio of a melting point of the third sublayer to a melting point of the support layer is $R_3$, where $1.35 \leq R_3 \leq 9.23$.

Therefore, the stepwise melting points of the sublayers in embodiments of this application facilitates formation of a riveted structure between the first metal portion and the support layer, and alleviates problems such as cracking or peel-off of the positive current collector caused by vibration during the welding.

In any embodiment, a melting point of the first sublayer is 650° C. to 660° C.

In any embodiment, a melting point of the second sublayer is 600° C. to 650° C.

In any embodiment, a melting point of the third sublayer is 540° C. to 600° C.

Therefore, in embodiments of this application, the melting points of different sublayers are so arranged that the melting points of different sublayers of the first metal portion show a tendency to change stepwise, thereby further preventing the problems such as cracking or peel-off of the positive current collector.

In any embodiment, the positive current collector further includes a protection layer. The protection layer is disposed on at least one of two opposite surfaces of the conductive layer in the thickness direction. The protection layer according to embodiments of this application can protect the conductive layer and enhance mechanical strength of the positive current collector.

In any embodiment, the first metal portion includes a metal matrix and a doping element. A thickness $D_4$ of the protection layer and a mass percent $W_1$ of the doping element satisfy the following formula: $D_4=(5+W_1\times100)$ nm.

Therefore, in embodiments of this application, with the increase of the mass percent of the doping metal, the thickness of the protection layer is increased, thereby improving electrochemical stability of the current collector.

A second aspect of this application provides a secondary battery, including a positive electrode plate, a separator, and a negative electrode plate. The positive electrode plate includes the positive current collector according to the first aspect of this application and a positive active material layer formed on at least one surface of the positive current collector.

A third aspect of this application provides an electrical device, including the secondary battery according to the second aspect of this application. The secondary battery is configured to provide electrical energy.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

REFERENCE NUMERALS

Figure 1:
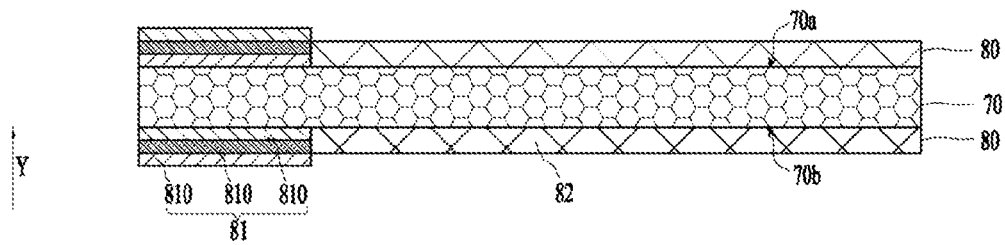
FIG. 1 is a schematic structural diagram of a positive current collector according to some embodiments of this application.

X—first direction; Y—thickness direction; 1—electrical device; 10—battery pack; 11—lower box; 12—upper box; 20—battery module; 30—secondary battery; 31—cap assembly; 32—shell; 40—electrode assembly; 41—positive electrode plate; 42—tab; 50—positive current collector; 60—positive active material layer; 70— support layer; 70a—first surface; 70b—second surface; 80—conductive layer; 81— first metal portion; 810—sublayer; 811—first sublayer; 812—second sublayer; 813— third sublayer; 82—second metal portion; 90—protection layer.

DETAILED DESCRIPTION OF EMBODIMENTS

The following describes in detail a positive current collector, a secondary battery, and an electrical device according to embodiments of this application with reference to drawings as appropriate. However, unnecessary details may be omitted in some cases. For example, a detailed description of a well-known matter or repeated description of a substantially identical structure may be omitted. That is intended to prevent the following descriptions from becoming unnecessarily long, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by selecting a lower limit and an upper limit. The selected lower and upper limits define the boundaries of the given range. A range so defined may be inclusive or exclusive of the end values, and may be arbitrarily combined. That is, any lower limit may be combined with any upper limit to form a range. For example, if a range of 60 to 120 and a range of 80 to 110 are listed for a given parameter, it is expectable that such ranges may be understood as 60 to 110 and 80 to 120. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, the numerical range "0 to 5" means that all real numbers between 0 and 5 inclusive are listed herein, and the range "0 to 5" is just a brief representation of combinations of such numbers. In addition, when a parameter is expressed as an integer greater than or equal to 2, the expression is equivalent to that the parameter is an integer such as 2, 3, 4, 5, 6, 7, 8, 9, 10, 11, 12, and the like.

Unless otherwise expressly specified herein, all embodiments and optional embodiments hereof may be combined with each other to form a new technical solution. Unless otherwise expressly specified herein, all technical features and optional technical features hereof may be combined with each other to form a new technical solution.

Unless otherwise expressly specified herein, all the steps described herein may be performed sequentially or randomly, and preferably, performed sequentially. For example, that the method includes steps (a) and (b) indicates that the method may include steps (a) and (b) performed sequentially, or steps (b) and (a) performed sequentially. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, and may also mean closed-ended inclusion. For example, the terms "include" and "comprise" may mean inclusion of other items not listed, or inclusion of only the listed items.

Unless otherwise expressly specified herein, the term "or" is inclusive. For example, the phrase "A or B" means "A alone, B alone, or both A and B." More specifically, the condition "A or B" is satisfied by any of the following: A is true (or existent) and B is false (or absent); A is false (or absent) and B is true (or existent); or, both A and B are true (or existent).

It needs to be understood that the relational terms such as "first", "second" are merely used to differentiate one entity or operation from another, but do not require or imply any actual relationship or sequence between the entities or operations.

The above summary of this application is not intended to describe every disclosed embodiment or every implementation of this application. The following description exemplifies illustrative embodiments in more detail. In several places throughout this application, guidance is provided through a series of embodiments. The embodiments may be used in various combinations. In each instance, an enumerated list serves merely as a representative list, but is not to be construed as an exclusive list.

[Positive Current Collector]

An embodiment in the first aspect of this application provides a positive current collector. Referring to FIG. 1, the positive current collector 50 includes: a support layer 70; and a conductive layer 80 located on at least one surface of the support layer 70. The conductive layer 80 includes a first metal portion 81 configured to connect to a tab. Along a thickness direction Y of the conductive layer 80, the first metal portion 81 includes at least three sublayers 810. Melting points of the at least three sublayers 810 rise stepwise in ascending order of distance from the support layer 70.

The first metal portion 81 according to this embodiment of this application is configured to weld the tab, collect a current generated by a positive active material layer, and then output the current to outward through the tab.

In this embodiment of this application, the first metal portion 81 may be connected to the tab by welding.

A thickness direction Y of the conductive layer 80 is identical to a thickness direction Y of the support layer 70 in this embodiment of this application, and is herein briefly referred to as the thickness direction Y.

The support layer 70 in this embodiment of this application includes a first surface 70a and a second surface 70b that are opposite to each other in the thickness direction Y. The conductive layer 80 may be disposed on any one or two of the first surface 70a or the second surface 70b of the support layer 70. The conductive layer 80 and the support layer 70 are compounded into the positive current collector 50. The thickness of the conductive layer 80 is much less than the thickness of a current collector commonly used in the prior art, such as an aluminum-foil metallic current collector. The support layer 70 is made of a polymer material or a polymer-based composite material. The positive current collector 50 as a whole is relatively small in thickness, and relatively light in weight, thereby increasing a volumetric energy density of the secondary battery that uses the positive current collector 50.

In the positive current collector 50 according to this embodiment of this application, the first metal portion 81 includes at least three sublayers 810. Melting points of the at least three sublayers 810 rise stepwise in ascending order of distance from the support layer 70. The melting point of the sublayer 810 in contact with the support layer 70 is closer to the melting point of the support layer 70. Therefore, in a process of compounding the conductive layer 80 and the support layer 70, for example, by ultrasonic welding, the conductive layer 80 and the sublayer 810 penetrate each other more easily, and bond with each other more firmly after cooling down, thereby helping increase a bonding force between the conductive layer 80 and the support layer 70 and effectively preventing delamination and peel-off between the conductive layer 80 and the support layer 70. Moreover, the melting point of a sublayer 810 most distant from the support layer 70 is relatively high, so that the probability of adhesion between the sublayer 810 and a welding device is reduced, and consistency of welding is improved.

The sublayers 810 adjacent to the sublayer 810 in the middle are: a sublayer 810 in contact with the support layer 70, and a sublayer 810 most distant from the support layer 70. The melting point of the sublayer 810 in the middle falls between the melting points of the adjacent sublayers 810. During the welding, the sublayer 810 in the middle can penetrate and be penetrated by the sublayer 810 in contact with the support layer 70, and can penetrate and be penetrated by the sublayer 810 most distant from the support layer 70, thereby improving the capabilities of penetration between the sublayers 810 during welding, effectively preventing poor welding caused by an excessive difference of melting points between the sublayer 810 in contact with the support layer 70 and the sublayer 810 most distant from the support layer 70, and in turn, increasing the bonding force between different sublayers 810.

[Conductive Layer]

The conductive layer 80 in this embodiment of this application may be formed on the support layer 70 by at least one of the following means: mechanical rolling, bonding, vapor deposition (vapor deposition), chemical plating (Electroless plating), and electroplating (Electroplating). The vapor deposition or electroplating is preferred, that is, the conductive layer 80 is preferably a vapor deposition layer or an electroplated layer. In this way, closer bonding is implemented between the conductive layer 80 and the support layer 70, and the supporting and protection effects of the support layer 70 are effectively exerted on the conductive layer 80.

In this embodiment of this application, the thickness of the conductive layer 80 is relatively small, and a resistance of the conductive layer 80 is relatively large, thereby further increasing a short-circuit resistance of the secondary battery when a short circuit occurs under abnormal circumstances, reducing a short-circuit current significantly, forming a "point break" at a short-circuit point, and in turn, improving safety performance of the secondary battery. The conductive layer 80 includes a first metal portion 81 and a second metal portion 82. The first metal portion 81 is configured to connect to the tab, and the second metal portion 82 is configured to connect to the positive active material layer.

In some embodiments, the first metal portion 81 includes a metal matrix and a doping element. The metal matrix is selected from aluminum or an aluminum-based alloy. The doping element is one or more selected from beryllium, calcium, cadmium, cerium, indium, lanthanum, lithium, neodymium, nickel, palladium, praseodymium, samarium, tin, yttrium, ytterbium, zinc, gallium, germanium, silicon, samarium, uranium, magnesium, or copper. The doping element coordinates with the metal matrix, so as to significantly lower the melting point of the first metal portion 81, and adjust the melting points of different sublayers of the first metal portion 81 to change stepwise. For example, the metal matrix is aluminum, an aluminum-nickel alloy, an aluminum-titanium alloy, or an aluminum-silver alloy. The first metal portion 81 is an aluminum-beryllium alloy; an alloy compounded of aluminum, silver, and calcium; or an alloy compounded of aluminum, beryllium, and calcium.

In some embodiments, based on a total mass percent W of the first metal portion 81 being 100%, a mass percent $W_1$ of the doping element is 0.5% to 10%, and a mass percent $W_2$ of the metal matrix is 90% to 99.5%. The doping element added at the foregoing mass percent can significantly lower the melting point of the first metal portion 81. Energy required for melting the first metal portion 81 heated under the action of ultrasonic waves is lower, thereby facilitating fusion with the tab and improving the welding effect. By adjusting the types and mass percent of doping elements, stepwise melting points can be formed between the sublayers 810 of the first metal portion 81. In addition, the doping element added at the foregoing mass percent coordinates with the metal matrix, so as to ensure sufficient conductivity of the first metal portion 81 and stability in an electrochemical environment.

The mass percent of the doping element is 0.5% to 10%, for example, 0.5%, 0.8%, 1.0%, 1.2%, 1.5%, 1.8%, 2.0%, 2.5%, 3.0%, 3.5%, 4.0%, 4.6% %, 4.9%, 5.0%, 5.5%, 6.0%, 6.5%, 7.0%, 7.5%, 8.0%, 8.5%, 9.0%, 9.5%, or 10.0%, or the mass percent of the doping element may fall within a range formed by any two thereof. The mass percent of the doping element is optionally 1.5% to 8.0%, and the mass percent of the doping element is optionally 5.0% to 8.0%. Correspondingly, the mass percent of the metal matrix is selected with reference to the mass percent of the doping element.

In some embodiments, a ratio of a melting point of the first metal portion 81 to a melting point of the support layer 70 is $R_4$, where $1.35 \leq R_4 \leq 10$. When the melting point ratio between the first metal portion 81 and the support layer 70 falls within the foregoing range, the first metal portion 81 and the support layer 70 can fuse with each other more easily during welding, and can bond with each other more firmly.

The ratio $R_4$ of the melting point of the first metal portion 81 to the melting point of the support layer 70 satisfies: $1.35 \leq R_4 \leq 10$. For example, the ratio may be 1.35, 1.5, 2.0, 2.5, 3.0, 3.5, 4.0, 4.5, 5.0, 5.5, 6.0, 6.5, 7.0, 7.5, 8.0, 8.5, 9.0, or 10, or $R_4$ falls within a range formed by any two thereof. Optionally, $2 \leq R_4 \leq 7.5$.

In some embodiments, the melting point of the first metal portion 81 is 540° C. to 650° C. The doping metal is added into the metal matrix to form the first metal portion 81 with stepwise melting points, thereby facilitating the welding between the first metal portion 81 and the support layer 70, and in turn, increasing the bonding force between the first metal portion 81 and the support layer 70. The melting point of the first metal portion 81 may be selected on the basis of $R_4$ described above.

The melting point of the first metal portion 81 is 540° C. to 650° C. For example, the melting point may be 540° C., 550° C., 560° C., 570° C., 580° C., 590° C., 600° C., 610° C., 620° C., 630° C., 640° C., or 650° C., or the melting point of the first metal portion 81 may fall within a range formed by any two thereof. Optionally, the melting point of the first metal portion 81 is 540° C. to 620° C.

In some embodiments, the conductive layer 80 includes a second metal portion 82 configured to connect to a positive active material layer, and a melting point of the second metal portion 82 is 600° C. to 660° C. For example, the second metal portion 82 includes a metal matrix. The metal matrix is selected from aluminum or an aluminum-based alloy. For example, the metal matrix is aluminum, an aluminum-nickel alloy, an aluminum-titanium alloy, or an aluminum-silver alloy. On the basis of ensuring sufficient electrical conductivity of the second metal portion 82, the metal matrix of the second metal portion 82 may be doped with a doping metal.

For example, the doping element is one or more selected from beryllium, calcium, cadmium, cerium, indium, lanthanum, lithium, neodymium, nickel, palladium, praseodymium, samarium, tin, yttrium, ytterbium, zinc, gallium, germanium, silicon, samarium, uranium, magnesium, or copper.

The melting point of the second metal portion 82 is 600° C. to 660° C. For example, the melting point may be 600° C., 610° C., 620° C., 630° C., 640° C., 650° C., or 660° C., or the melting point of the second metal portion 82 may fall within a range formed by any two thereof. Optionally, the melting point of the second metal portion 82 is 620° C. to 660° C.

In some embodiments, a ratio of a thickness of the first metal portion 81 to a thickness of the second metal portion 82 is A, where $1.01 \leq A \leq 3$. The first metal portion 81 falling within the foregoing range of the thickness ratio can improve the welding effect of the first metal portion 81, improve the flow capacity and mechanical durability, avoid excessive thickness of the first metal portion 81, and facilitate integrated processing of the positive current collector 50. When A is less than 1.01, the thickness of the first metal portion 81 does not increase significantly, and exerts no effect of improving welding, flow capacity, and mechanical durability. When A is greater than 3, the thickness of the second metal portion 82 is excessive, and is adverse to the integrated processing of the positive current collector 50. When the excessively thick first metal portion 81 is compounded to the support layer 70, a large amount of heat is emitted, and is prone to cause high-temperature fusion and local decomposition of the support layer 70 corresponding to the first metal portion 81, and deteriorate the mechanical performance of the support layer 70 and the welding performance of the positive current collector 50. During rewinding of the positive current collector 50, the excessive thickness makes the positive current collector prone to wrinkle, and gives rise to local cracks of the conductive layer 80, thereby reducing the conductivity of the conductive layer 80 and reducing the energy density of the secondary battery.

The ratio A of the thickness of the first metal portion 81 to the thickness of the second metal portion 82 satisfies $1.01 \leq A \leq 3$. For example, A may be 1.01, 1.05, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3, or A falls within a range formed by any two thereof. Optionally, $1.2 \leq A \leq 2$. Further, optionally, $1.25 \leq A \leq 1.8$.

In some embodiments, the thickness $D_2$ of the first metal portion 81 satisfies 300 nm $\leq D_2 \leq 2$ μm. The thickness of the first metal portion 81 is moderate, so that the first metal portion 81 can effectively improve welding, flow capacity, and mechanical durability.

The thickness $D_2$ of the first metal portion 81 satisfies 300 nm $\leq D_2 \leq 2$ μm. For example, $D_2$ is 300 nm, 400 nm, 500 nm, 600 nm, 700 nm, 800 nm, 900 nm, 1 μm, 1.2 μm, 1.3 μm, 1.5 μm, 1.8 μm, or 2 μm, or the thickness of the first metal portion 81 falls within a range formed by any two thereof. Optionally, 500 nm $\leq D_2 \leq 1.5$ μm. Further, optionally, 800 nm $\leq D_2 \leq 1.1$ μm.

In some embodiments, the thickness $D_3$ of the second metal portion 82 satisfies 300 nm $\leq D_3 \leq 2$ μm. The moderate thickness of the second metal portion 82 not only helps increase a short-circuit internal resistance of the second metal portion 82, but also improves the capability of the secondary battery in resisting an internal short circuit, and also prevents the positive current collector 50 from being damaged during subsequent processing.

The thickness $D_3$ of the second metal portion 82 satisfies 300 nm≤$D_3$≤2 µm. For example, the thickness may be 300 nm, 400 nm, 500 nm, 600 nm, 700 nm, 800 nm, 900 nm, 1 µm, 1.2 µm, 1.3 µm, 1.5 µm, 1.8 µm, or 2 µm, or the thickness of the second metal portion 82 falls within a range formed by any two thereof. Optionally, 500 nm≤$D_3$≤1.5 µm. Further, optionally, 800 nm≤$D_3$≤1.1 µm.

In some embodiments, a ratio B of a dimension of the second metal portion 82 to a dimension of the first metal portion 81 along a first direction X satisfies 10≤B≤500. In this embodiment of this application, the first direction X is a width direction of the conductive layer 80. Along the first direction X, the dimension of the second metal portion 82 is the width of the second metal portion 82; and, along the first direction X, the dimension of the first metal portion 81 is the width of the first metal portion 81. When the ratio of the width of the second metal portion 82 to the width of the first metal portion 81 falls within the foregoing range, the ratio helps improve the energy density, cycle performance, and rate performance of the secondary battery that uses the positive current collector 50. When B is less than 10, the proportion of the first metal portion 81 is excessive, thereby being adverse to improving the energy density of the secondary battery. When B is greater than 500, the proportion of the first metal portion 81 is deficient, and the width of the second metal portion 82 is excessive. Consequently, a current transmission path is excessively long, and the internal resistance and heat emission amount inside the secondary battery are excessive, thereby being adverse to improving the cycle performance and rate performance of the secondary battery.

The ratio B of the dimension of the second metal portion 82 to the dimension of the first metal portion 81 along the first direction X satisfies 10≤B≤500. For example, B may be 10, 20, 30, 40, 50, 60, 70, 80, 90, 100, 110, 120, 130, 140, 150, 180, 190, 200, 240, 250, 280, 300, 320, 350, 380, 400, 420, 450, 480, or 500, or B falls within a range formed by any two thereof. Optionally, 50≤B≤200. Further, optionally, 60≤B≤120.

In some embodiments, the dimension $C_1$ of the first metal portion 81 along the first direction X satisfies 1 mm<$C_1$≤20 mm. When the dimension $C_1$ of the first metal portion 81 is less than 1 mm, the width of the first metal portion 81 is deficient, the welding area is excessively small, and the mechanical force that the first metal portion 81 can bear is deficient, thereby being hardly able to meet the requirement on the welding reliability of the secondary battery. When the dimension $C_1$ of the first metal portion 81 is greater than 20 mm, the width of the first metal portion 81 is excessive, thereby being adverse to improving space efficiency inside the secondary battery, and decreasing the energy density of the secondary battery. The excessive width of the first metal portion 81 causes waste of the positive current collector 50 during die cutting, reduces the utilization rate of the positive current collector 50, and increases risks of lap-joint between the tab and the positive current collector 50.

Along the first direction X, the dimension $C_1$ of the first metal portion 81 satisfies 1 mm<$C_1$≤20 mm, and may be, for example, 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, or 20 mm, or $C_1$ falls within a range formed by any two thereof. Optionally, 2 mm≤$C_1$≤10 mm; and, further optionally, 3 mm≤$C_1$≤5 mm.

In some embodiments, the dimension $C_2$ of the second metal portion 82 along the first direction X satisfies 100 mm<$C_2$≤800 mm. The moderate width of the second metal portion 82 can improve the conductivity of the second metal portion 82, and ensure a relatively high energy density of the secondary battery.

Along the first direction X, the dimension $C_2$ of the second metal portion 82 satisfies 200 mm≤$C_2$≤800 mm. For example, the dimension may be 200 mm, 300 mm, 400 mm, 500 mm, 600 mm, 700 mm, or 800 mm, or the width of the second metal portion 82 may fall within a range formed by any two thereof. Optionally, 200 mm≤$C_2$≤800 mm; and, further optionally, 300 mm≤$C_2$≤500 mm.

Figure 2:
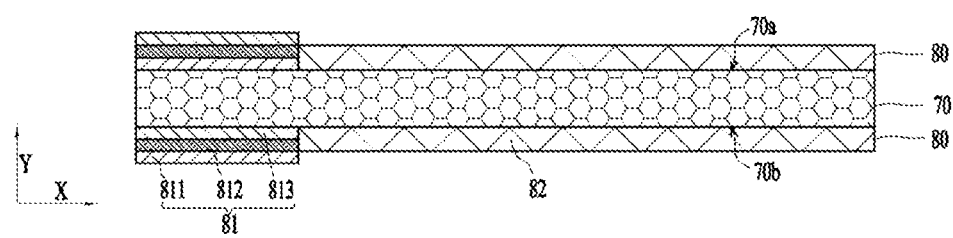
FIG. 2 is a schematic structural diagram of a positive current collector according to some embodiments of this application.

In some embodiments, referring to FIG. 2, along the thickness direction Y, the first metal portion 81 includes a first sublayer 811, a second sublayer 812, and a third sublayer 813. The third sublayer 813 is located on a surface of the support layer 70. The second sublayer 812 is located on a side that is of the third sublayer 813 and that is back from the support layer 70. The first sublayer 811 is located on a side that is of the second sublayer 812 and that is back from the support layer 70. It needs to be noted that the first metal portion 81 may include three sublayers, and the melting points of the three sublayers are stepwise. Definitely, the first metal portion 81 may include four, five, or more sublayers instead to form more steps of melting points. For example, the first metal portion 81 includes four sublayers: a first sublayer 811, a second sublayer 812, a fourth sublayer, and a third sublayer 813 that are sequentially stacked along the thickness direction Y. The melting point of the second sublayer 812 may be identical to or different from the melting point of the fourth sublayer.

The first sublayer 811 includes a first metal matrix. The first metal matrix is selected from aluminum or an aluminum-based alloy. The melting point of the first sublayer 811 is relatively high, and the energy required for melting is relatively high, so that the first sublayer is not prone to adhere to a welding device.

The second sublayer 812 includes a second metal matrix and a second doping element. The second metal matrix is selected from aluminum or an aluminum-based alloy. The second doping element is one or more selected from beryllium, calcium, cadmium, cerium, indium, lanthanum, lithium, neodymium, nickel, palladium, praseodymium, samarium, tin, yttrium, ytterbium, zinc, gallium, germanium, silicon, samarium, uranium, magnesium, or copper. The second doping element added in the second metal matrix can appropriately lower the melting point of the second sublayer 812. The melting points of the first sublayer 811, the second sublayer 812, and the third sublayer 813 show a tendency to change stepwise. When the first metal portion 81 is melted under heat, the energy required for melting differs between sublayers. Especially, the energy required for melting the first sublayer 811 differs sharply from the energy required for melting the third sublayer 813. When melting occurs, the second sublayer 812 can penetrate and bond with the first sublayer 811 and the third sublayer 813 separately, so as to increase the bonding force between the layers and reduce the probability of peel-off and delamination between different sublayers 810 inside the first metal portion 81.

The third sublayer 813 includes a third metal matrix and a third doping element. The third metal matrix is selected from aluminum or an aluminum-based alloy. The third doping element is one or more selected from beryllium, calcium, cadmium, cerium, indium, lanthanum, lithium, neodymium, nickel, palladium, praseodymium, samarium, tin, yttrium, ytterbium, zinc, gallium, germanium, silicon, samarium, uranium, magnesium, or copper. The third doping element added in the third metal matrix can significantly lower the melting point of the third sublayer 813. The energy required for melting the third sublayer 813 is relatively low. When melting, the third sublayer can penetrate and be penetrated by the support layer 70, and bond with each other after cooling down, thereby increasing the bonding force between the third sublayer 813 and the support layer 70.

In some optional embodiments, the first metal matrix is selected from aluminum. The second metal matrix is selected from aluminum, and the second doping element is one or more selected from calcium, cerium, indium, lanthanum, lithium, neodymium, palladium, praseodymium, samarium, tin, yttrium, ytterbium, or zinc. The third metal matrix is selected from aluminum, and the third doping element is one or more selected from gallium, germanium, silicon, magnesium, or copper.

A material made of the foregoing metal matrix elements is of relatively high conductivity. The doping element is compounded with the metal matrix to form an alloy to lower the melting point of the first metal portion 81, thereby further improving the bonding force between the first metal portion 81 and the support layer 70, and in turn, improving the overall welding quality of the positive current collector 50.

In some optional embodiments, the first metal matrix is selected from aluminum. The second metal matrix is selected from aluminum, and the second doping element is one or more selected from calcium, cerium, lanthanum, lithium, neodymium, nickel, palladium, praseodymium, samarium, yttrium, ytterbium, samarium, uranium, or copper. The third metal matrix is selected from aluminum, and the third doping element is one or more selected from calcium, cerium, lanthanum, lithium, neodymium, nickel, palladium, praseodymium, samarium, yttrium, ytterbium, samarium, uranium, or copper. The first sublayer 811 is of relatively high tensile strength. The second doping element can form a nanometer-scale high-strength intermetallic compound phase in situ. The intermetallic compound phase is diffused in the second sublayer 812, thereby helping increase tensile strength of the second sublayer 812. The third doping element can form a nanometer-scale high-strength intermetallic compound phase in situ. The intermetallic compound phase is diffused in the third sublayer 813, thereby helping increase tensile strength of the third sublayer 813. The increase of the tensile strength of the first sublayer 811, the second sublayer 812, and the third sublayer 813 helps improve the overall tensile strength of the first metal portion 81.

In some optional embodiments, the first metal matrix is selected from aluminum. The second metal matrix is selected from aluminum, and the second doping element is one or more selected from cerium, lanthanum, nickel, praseodymium, samarium, uranium, ytterbium, or yttrium. The second doping element is configured to form an intermetallic compound, and the second sublayer 812 is doped with the intermetallic compound. The third metal matrix is selected from aluminum, and the third doping element is one or more selected from cerium, lanthanum, nickel, praseodymium, samarium, uranium, ytterbium, or yttrium. The third doping element is configured to form an intermetallic compound, and the third sublayer 813 is doped with the intermetallic compound. The second doping element and the third doping element can form an intermetallic compound phase separately for being distributed in the sublayers 810. Just a small doping percent can significantly lower the melting points of the second sublayer 812 and the third sublayer 813. In addition, the melting point of the first sublayer 811 is relatively high, making it easier to form stepwise melting points of the first metal portion 81 by doping with a small amount of the doping element.

In some embodiments, a ratio of the melting point of the first sublayer 811 to the melting point of the second sublayer 812 is $R_1$, where $1 \leq R_1 \leq 1.1$. Optionally, $1.05 \leq R_1 \leq 1.1$.

A ratio of the melting point of the second sublayer 812 to the melting point of the third sublayer 813 is $R_2$, where $1 < R_2 \leq 1.2$. Optionally, $1.1 \leq R_2 \leq 1.2$.

A ratio of the melting point of the third sublayer 813 to the melting point of the support layer 70 is $R_3$, where $1.35 \leq R_3 \leq 9.23$. Optionally, $2 \leq R_3 \leq 4$.

The stepwise melting points of the sublayers help the first metal portion 81 and the support layer 70 penetrate and fuse with each other, improve the bonding force between the first metal portion 81 and the support layer 70, and effectively prevent the first metal portion 81 from breaking apart from the support layer 70.

In some optional embodiments, the melting point of the first sublayer 811 is 650° C. to 660° C. For example, the melting point may be 650° C., 652° C., 655° C., 658° C., or 660° C., or the melting point of the first sublayer 811 may fall within a range formed by any two thereof.

In some optional embodiments, the melting point of the second sublayer 812 is 600° C. to 650° C. For example, the melting point may be 600° C., 610° C., 620° C., 630° C., 640° C., or 650° C., or the melting point of the second sublayer 812 may fall within a range formed by any two thereof.

In some optional embodiments, the melting point of the third sublayer 813 is 540° C. to 600° C. For example, the melting point may be 540° C., 550° C., 560° C., 570° C., 580° C., 590° C., or 600° C., or the melting point of the third sublayer 813 may fall within a range formed by any two thereof.

In some embodiments, a ratio of the thickness of the first sublayer 811 to the thickness of the second sublayer 812 is $N_1$, where $0.8 \leq N_1 \leq 1.2$. For example, the ratio may be 0.8, 0.9, 1.0, 1.1, or 1.2, or $N_1$ may fall within a range formed by any two thereof. Optionally, $0.9 \leq N_1 \leq 1.1$.

A ratio of the thickness of the second sublayer 812 to the thickness of the third sublayer 813 is $N_2$, where $0.8 \leq N_2 \leq 1.2$. For example, the ratio may be 0.8, 0.9, 1.0, 1.1, or 1.2, or $N_2$ may fall within a range formed by any two thereof. Optionally, $0.9 \leq N_2 \leq 1.1$.

A ratio of the thickness of the third sublayer 813 to the thickness of the support layer 70 is $N_3$, where $0.02 \leq N_3 \leq 0.5$. For example, the ratio may be 0.02, 0.05, 0.1, 0.15, 0.18, 0.20, 0.25, 0.30, 0.35, 0.40, 0.45, or 0.5, or $N_3$ may fall within a range formed by any two thereof. Optionally, $0.05 \leq N_3 \leq 0.1$.

When the thickness ratio between the sublayers falls within the foregoing range, the thickness of each sublayer is moderate, thereby being conducive to energy transfer during the welding, and ensuring effective fusion between the sublayers during the welding.

When the ratio of the thickness of the third sublayer 813 to the thickness of the support layer 70 falls within the foregoing range, it is ensured that a sufficient amount of third doping element in the low-melting-point third sublayer 813 penetrates into the support layer 70 during the welding, so as to form an effective fusion depth and increase the welding strength.

In some embodiments, the thickness of the first sublayer 811 is 100 nm to 1000 nm. For example, the thickness of the first sublayer 811 may be 100 nm, 150 nm, 200 nm, 250 nm, 300 nm, 400 nm, 450 nm, 500 nm, 550 nm, 600 nm, 650 nm, 700 nm, 750 nm, 800 nm, 850 nm, 900 nm, 950 nm, or 1000 nm, or the thickness of the first sublayer 811 may fall within a range formed by any two thereof. Optionally, the thickness of the first sublayer 811 is 200 nm to 500 nm.

The thickness of the second sublayer 812 is 100 nm to 1000 nm. For example, the thickness of the second sublayer 812 may be 100 nm, 150 nm, 200 nm, 250 nm, 300 nm, 400 nm, 450 nm, 500 nm, 550 nm, 600 nm, 650 nm, 700 nm, 750 nm, 800 nm, 850 nm, 900 nm, 950 nm, or 1000 nm, or the thickness of the second sublayer 812 may fall within a range formed by any two thereof. Optionally, the thickness of the second sublayer 812 is 200 nm to 500 nm.

The thickness of the third sublayer 813 is 100 nm to 1000 nm. For example, the thickness of the third sublayer 813 may be 100 nm, 150 nm, 200 nm, 250 nm, 300 nm, 400 nm, 450 nm, 500 nm, 550 nm, 600 nm, 650 nm, 700 nm, 750 nm, 800 nm, 850 nm, 900 nm, 950 nm, or 1000 nm, or the thickness of the third sublayer 813 may fall within a range formed by any two thereof. Optionally, the thickness of the third sublayer 813 is 200 nm to 500 nm.

The specific thickness values of the first sublayer 811, the second sublayer 812, and the third sublayer 813 may be selected based on the ratio relationship between the sublayers 810, so as to ensure effective fusion between the sublayers during the welding.

[Support Layer]

The support layer 70 in this embodiment of this application exerts a supporting and protection effect on the conductive layer 80. The relatively high resistance of the support layer increases a short-circuit resistance of the secondary battery when a short circuit occurs under abnormal circumstances, thereby reducing a short-circuit current significantly, forming a "point break" at a short-circuit point, and improving safety performance of the secondary battery.

In some embodiments, the support layer 70 includes one or more of a polymer material or a polymer-based composite material. The support layer 70 is small in thickness and light in weight, thereby significantly improving an energy density of the secondary battery.

In some optional embodiments, the polymer material includes one or more of polyamide (Polyamide, PA for short), polyimide (Polyimide, PI for short), polyethylene terephthalate (poly(ethylene terephthalate), PET for short), polybutylene terephthalate (Polybutylene terephthalate, PBT for short), polyethylene naphthalate (Polyethylene naphthalate two formic acid glycol ester, PEN for short), polycarbonate (Polycarbonate, PC for short), polyethylene (Polyethylene, PE for short), polypropylene (Polypropylene, PP for short), polyphenylene ether (PPE for short), poly(acrylonitrile-co-butadiene-co-styrene) (Acrylonitrile butadiene styrene copolymers, ABS for short), polyvinyl alcohol (Polyvinyl alcohol, PVA for short), polystyrene (Polystyrene for short), polyvinyl chloride (Polyvinyl chloride, PVC for short), polyvinylidene difluoride (Polyvinylidenefluoride, PVDF for short), polytetrafluoroethylene (Polytetrafluoroethylene, PTFE for short), poly(sodium-p-styrenesulfonate, PSS for short), polyacetylene (Polyacetylene), silicone rubber (Silicone rubber), polyoxymethylene (Polyformaldehyde, POM for short), polyphenylene oxide (Polyphenylene Oxide, PPO for short), polyphenylene sulfide (Polyphenylene sulfide, PPS for short), polyethylene glycol (Polyethylene glycol, PEG for short), polythiaxyl (Polythiaxyl), polyphenyl (Polyphenyl), polypyrrole (Polypyrrole, PPy for short), polyaniline (Polyaniline, PAN for short), polythiophene (Polythiophene, PT for short), polypyridine (Polypyridine, PPY for short), cellulose, starch, protein, epoxy resin (Epoxy resin), phenol-formaldehyde resin (phenol-formaldehyde resin), a derivative thereof, a crosslinked polymer thereof, or a copolymer thereof. Optionally, the polymer material is one or more of polyamide, polyimide, polyethylene terephthalate, polypropylene, or polyphenylene sulfide.

In some optional embodiments, the polymer-based composite material includes the polymer material and a metal material. Optionally, the metal material includes one or one of magnesium, calcium, strontium, lead, zinc, tin, antimony, bismuth, silver, or ruthenium. When the polymer material is doped with the metal, the support layer 70 can fuse with the metal element of the first metal portion 81 during melting. The support layer 70 and the first metal portion 81 penetrate each other, thereby significantly improving the welding strength and the yield rate, and reducing the probability of cold solder joints.

In some optional embodiments, based on a total mass percent of the polymer-based composite material being 100%, a doping percent of the metal material is less than or equal to 10%, and optionally, the doping percent of the metal material falls within a range that is less than or equal to 5%. The metal material doped with the metal in a doping percent that falls within the foregoing range can ensure a sufficient volumetric energy density of the secondary battery, and can also increase the bonding force between the support layer 70 and the first metal portion 81.

In some optional embodiments, $D_{50}$ of the metal material is less than or equal to 5 µm. Optionally, $D_{50}$ of the metal material ranges from 1 µm to 3 µm, where $D_{50}$ is a particle diameter measured when a cumulative volume percentage of the metal material reaches 50%, that is, a median diameter in a volume-based particle size distribution. With $D_{50}$ falling within the foregoing range, the particle size of the metal material is moderate, thereby preventing local agglomeration of particles. The metal particles can be added uniformly as a dopant into the polymer material. The metal particles are substantially prevented from protruding from the support layer 70. The support layer 70 formed by the polymer material and the metal material is uniform in thickness.

In some embodiments, the melting point of the support layer 70 is 65° C. to 400° C. The melting point of the support layer 70 is close to the melting point of a sublayer that is of the first metal portion 81 and that is close to the support layer 70, thereby preventing the defect rate of welding from increasing due to large thermal deformation caused by a great difference of melting points, where the thermal deformation reduces the welding tension. The support layer 70 and the sublayer differ little in the melting point, penetrate each other during melting, and bond with each other more firmly after cooling down. The melting point of the support layer 70 may be selected on the basis of $R_4$.

The melting point of the support layer 70 is 65° C. to 400° C. For example, the melting point may be 65° C., 70° C., 80° C., 90° C., 100° C., 120° C., 150° C., 180° C., 200° C., 220° C., 250° C., 280° C., 300° C., 350° C., or 400° C., or the melting point of the support layer 70 may fall within a range formed by any two thereof. Optionally, the melting point of the support layer 70 is 150° C. to 300° C. Further, optionally, the melting point of the support layer 70 is 160° C. to 260° C.

In some embodiments, a Vicat softening temperature of the support layer 70 is less than or equal to 300° C. Optionally, the Vicat softening temperature of the support layer 70 is less than or equal to 250° C. The support layer 70 with such a Vicat softening temperature melts more easily to fuse with the first metal portion 81.

The Vicat softening temperature (Vicat Softening Temperature) is a temperature at which the support layer 70 is penetrated to a depth of 1 mm by a flat-ended needle with a 1 mm² cross-section under a load of 10 N, where the support layer 70 is placed in a liquid heat-transfer medium (liquid paraffin/glycerol/silicone oil) heated up at an equal speed of 50° C. per hour.

In some embodiments, the thickness $D_1$ of the support layer 70 satisfies 1 µm≤$D_1$≤20 µm. The support layer 70 falling within the foregoing thickness range improves mechanical strength, and is not prone to break off during processing and use, and can well support and protect the conductive layer 80 and ensure high mechanical stability and a long service life of the positive current collector 50. The thickness of the support layer 70 is optionally less than 20 µm, further optionally, less than 10 µm, and still optionally, less than 6 µm, thereby reducing the secondary battery in size and weight, and increasing the energy density of the secondary battery.

The thickness $D_1$ of the support layer 70 satisfies 1 µm≤$D_1$≤20 µm, for example, may be 1 µm, 1.5 µm, 2 µm, 3 µm, 4 µm, 5 µm, 6 µm, 7 µm, 8 µm, 10 µm, 12 µm, 15 µm, 18 µm, or 20 µm, or the thickness $D_1$ of the support layer 70 may fall within a range formed by any two thereof. Optionally, 2 µm≤$D_1$≤10 µm. Further, optionally, 2 µm≤$D_1$≤6

[Protection Layer]

Figure 3:
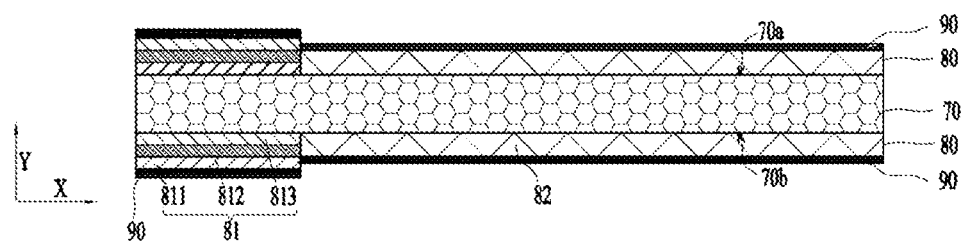
FIG. 3 is a schematic structural diagram of a positive current collector according to some embodiments of this application.

In some embodiments, referring to FIG. 3, the positive current collector 50 further includes a protection layer 90. The protection layer 90 is disposed on at least one of two opposite surfaces of the conductive layer 80 in the thickness direction Y. The conductive layer 80 includes two opposite surfaces in the thickness direction Y. The protection layer 90 is stacked on either or both of the two surfaces of the conductive layer 80 to protect the conductive layer 80, prevent the conductive layer 80 from damage such as chemical corrosion or mechanical damage, and ensure relatively high operating stability and a relatively long service life of the positive current collector 50. In addition, the protection layer 90 can enhance mechanical strength of the positive current collector 50.

The material of the protection layer 90 may be one or more of a metal, metal oxide, or conductive carbon. The protection layer 90 made of a metal material is a metal protection layer; and the protection layer 90 made of metal oxide material is a metal oxide protection layer. The metal may be, for example, one or more of nickel, chromium, nickel-based alloy, or copper-based alloy. The nickel-based alloy is an alloy compounded by adding one or more other elements into a substrate of pure nickel, and preferably, a nickel-chromium alloy.

The metal oxide may be, for example, one or more of aluminum oxide, cobalt oxide, chromium oxide, or nickel oxide.

The conductive carbon may be, for example, one or more of graphite, superconductive carbon, acetylene black, carbon black, Ketjen black, carbon dots, carbon nanotubes, graphene, and carbon nanofibers, and preferably, one or more of carbon black, carbon nanotubes, acetylene black, or graphene.

In some embodiments, the thickness $D_4$ of the protection layer 90 and a mass percent $W_1$ of the doping element satisfy: protection layer 90 thickness $D_4$=(5+$W_1$×100) nm. With the increase of the mass percent of the doping element, the thickness of the protection layer 90 is increased, thereby improving cycle performance of the secondary battery.

In some embodiments, the thickness $D_4$ of the protection layer 90 is greater than or equal to 5 nm. The protection layer 90 with a thickness falling within the foregoing range can effectively protect the conductive layer 80 and enable the secondary battery to achieve high cycle performance. The thickness $D_4$ of the protection layer 90 may be selected based on: $D_4$=(5+$W_1$×100) nm.

The applicant finds that, with the increase of the mass percent of the doping element in the conductive layer, the positive current collector is more prone to chemically react with an electrolytic solution, thereby corroding the positive current collector. In addition, when the secondary battery undergoes charge-and-discharge cycles, the positive current collector is subjected to repeated expansion/contraction stress, so that the protection layer on the surface of the conductive layer is damaged gradually. The contact area between the metal element (metal matrix and doping element) contained in the conductive layer and the electrolytic solution increases, thereby aggravating corrosion of the positive current collector. In severe cases, the corrosion may impair the conductivity of the positive current collector, obstruct a conductive network, and in turn, deteriorate the cycle performance of the secondary battery drastically. To improve the cycle performance of the secondary battery, the inventor finds that in this embodiment of this application, with the increase of the mass percent of the doping element, the thickness of the protection layer 90 is increased, thereby ensuring that the long-term cycle performance of the secondary battery is more reliable.

The thickness $D_4$ of the protection layer 90 is greater than or equal to 5 nm, for example, $D_4$ may be 5 nm, 10 nm, 20 nm, 30 nm, 50 nm, 80 nm, 100 nm, 120 nm, 150 nm, 180 nm, 200 nm, 220 nm, 250 nm, 280 nm, 300 nm, or 400 nm. Optionally, the thickness $D_4$ of the protection layer 90 satisfies 5 nm≤$D_4$≤200 nm.

In addition, electrode plates, a secondary battery, a battery module, a battery pack, and an electrical device according to this application are described below in due detail with reference to the drawings.

[Positive Electrode Plate]

Figure 4:
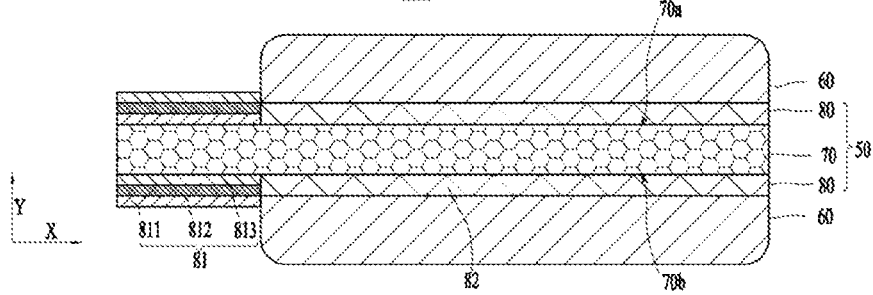
FIG. 4 is a schematic structural diagram of a positive electrode plate of a secondary battery according to some embodiments of this application.

In some embodiments, referring to FIG. 4, a positive electrode plate 41 includes a positive current collector 50 and a positive active material layer 60 formed on at least one surface of the positive current collector 50.

Exemplarily, the positive electrode plate 41 includes a support layer 70, a conductive layer 80, and the positive active material layer 60 that are stacked together. The support layer 70 includes a first surface 70a and a second surface 70b that are opposite to each other. The conductive layer 80 is stacked on the first surface 70a and/or the second surface 70b of the support layer 70. The positive active material layer 60 is disposed on a surface that is of the conductive layer 80 and that is back from the support layer 70. Understandably, when the conductive layer 80 is disposed on both opposite surfaces of the support layer 70, the positive current collector 50 is coated with an active material on both sides, and the prepared positive electrode plate 41 can be directly applied to the secondary battery. When the conductive layer 80 is disposed on a single surface of the support layer 70, the positive current collector 50 is coated with the active material on a single side, and the prepared positive electrode plate 41 can be applied to the secondary battery after being folded.

In some embodiments, the positive active material applied in the positive active material layer 60 may be a positive active material that is well known in the art for use in a secondary battery. Exemplarily, the positive active material may include at least one of the following materials: olivine-structured lithium-containing phosphate, lithium transition metal oxide, and a modified compound thereof. However, this application is not limited to such materials, and other conventional materials usable as a positive active material may be used instead. One of the positive active materials may be used alone, or at least two thereof may be combined and used together. Examples of the lithium transition metal oxide may include, but are not limited to, at least one of lithium cobalt oxide (such as $LiCoO_2$), lithium nickel oxide (such as $LiNiO_2$), lithium manganese oxide (such as $LiMnO_2$, and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as $NCM_{333}$), $LiNi_{0.5}Co_{0.2}Mn_{0.3}O_2$ (briefly referred to as $NCM_{523}$), $LiNi_{0.5}Co_{0.25}Mn_{0.25}O_2$ (briefly referred to as $NCM_{211}$), $LiNi_{0.6}Co_{0.2}Mn_{0.2}O_2$ (briefly referred to as $NCM_{622}$), $LiNi_{0.8}Co_{0.1}Mn_{0.1}O_2$ (briefly referred to as $NCM_{811}$)), lithium nickel cobalt aluminum oxide (such as $LiNi_{0.85}Co_{0.15}Al_{0.05}O_2$), or a modified compound thereof. Examples of the olivine-structured lithium-containing phosphate may include, but are not limited to, at least one of lithium iron phosphate (such as $LiFePO_4$ (briefly referred to as LFP)), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

In some embodiments, the positive active material layer 60 further optionally includes a binder. Exemplarily, the binder may include at least one of polyvinylidene difluoride (PVDF), polytetrafluoroethylene (PTFE), poly(vinylidene fluoride-co-tetrafluoroethylene-co-propylene), poly (vinylidene fluoride-co-hexafluoropropylene-co-tetrafluoroethylene), poly(tetrafluoroethylene-co-hexafluoropropylene), or fluorinated acrylate resin.

In some embodiments, the positive active material layer 60 further optionally includes a conductive agent. Exemplarily, the conductive agent may include at least one of superconductive carbon, acetylene black, carbon black, Ketjen black, carbon dots, carbon nanotubes, graphene, or carbon nanofibers.

In some embodiments, the positive electrode plate 41 may be prepared according to the following method: dispersing the ingredients of the positive electrode plate 41 such as the positive active material, the conductive agent, and the binder and any other ingredients in a solvent (such as N-methylpyrrolidone) to form a positive slurry, coating a positive current collector with the positive slurry, and performing steps such as drying and cold pressing to obtain the positive electrode plate 41.

[Negative Electrode Plate]

In some embodiments, the negative electrode plate includes a negative current collector and a negative active material layer formed on a surface of the negative current collector, where the negative current collector is a copper foil.

In some embodiments, the negative active material in the negative active material layer may be a negative active material that is well known in the art for use in a secondary battery. Exemplarily, the negative active material may include at least one of the following materials: artificial graphite, natural graphite, soft carbon, hard carbon, silicon-based material, tin-based material, lithium titanium oxide, and the like. The silicon-based material may be at least one selected from simple-substance silicon, silicon-oxygen compound, silicon-carbon composite, silicon-nitrogen composite, or silicon alloy. The tin-based material may be at least one selected from simple-substance tin, tin-oxygen compound, or tin alloy. However, this application is not limited to such materials, and other conventional materials usable as a negative active material of a battery may be used instead. One of the negative active materials may be used alone, or at least two thereof may be combined and used together.

In some embodiments, the negative active material layer further optionally includes a binder. The binder may be at least one selected from styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), and carboxymethyl chitosan (CMCS).

In some embodiments, the negative active material layer further optionally includes a conductive agent. The conductive agent may be at least one selected from superconductive carbon, acetylene black, carbon black, Ketjen black, carbon dots, carbon nanotubes, graphene, or carbon nanofibers.

In some embodiments, the negative active material layer further optionally includes other agents, such as a thickener (for example, sodium carboxymethyl cellulose (CMC-Na)).

In some embodiments, the negative electrode plate may be prepared according to the following method: dispersing the ingredients of the negative electrode plate such as the negative active material, the conductive agent, and the binder and any other ingredients in a solvent (such as deionized water) to form a negative slurry, coating a negative current collector with the negative slurry, and performing steps such as drying and cold pressing to obtain the negative electrode plate.

[Electrolyte]

The electrolyte serves to conduct ions between the positive electrode plate and the negative electrode plate. The type of the electrolyte is not specifically limited in this embodiment of this application, and may be selected as required. For example, the electrolyte may be in liquid- or gel-state, or all solid-state.

In some embodiments, the electrolyte is an electrolytic solution. The electrolytic solution includes an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro(oxalato)borate, lithium bis(oxalato)borate, lithium difluoro(bisoxalato) phosphate, or lithium tetrafluoro(oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethylsulfonyl)ethane.

In some embodiments, the electrolytic solution further optionally includes an additive. For example, the additive may include a negative film-forming additive or a positive film-forming additive. The additive may further include additives capable of improving specified performance of the battery, for example, an additive for improving overcharge performance of the battery, an additive for improving high- or low-temperature performance of the battery, and the like.

[Separator]

In some embodiments, the secondary battery further includes a separator. The type of the separator is not specifically limited in this embodiment of this application, and may be any well-known porous separator that is highly chemically and mechanically stable.

In some embodiments, the material of the separator may be at least one selected from glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be wound or stacked to form an electrode assembly.

In some embodiments, the secondary battery may include an outer package. The outer package may be configured to package the positive electrode plate, the negative electrode plate, the separator, and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The material of the soft package may be plastic such as polypropylene, polybutylene terephthalate, or polybutylene succinate.

[Secondary Battery]

An embodiment in a second aspect of this application provides a secondary battery 30.

Figure 5:
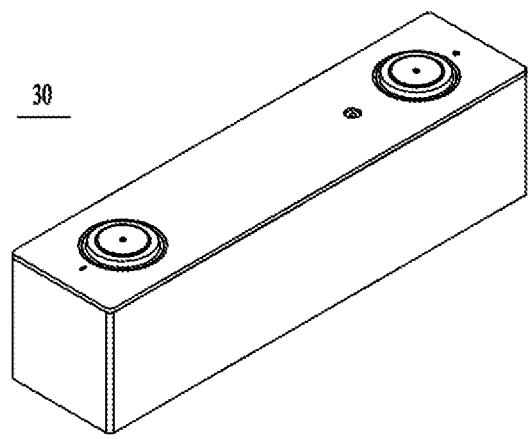
FIG. 5 is a schematic structural diagram of a secondary battery according to some embodiments of this application.
Figure 6:
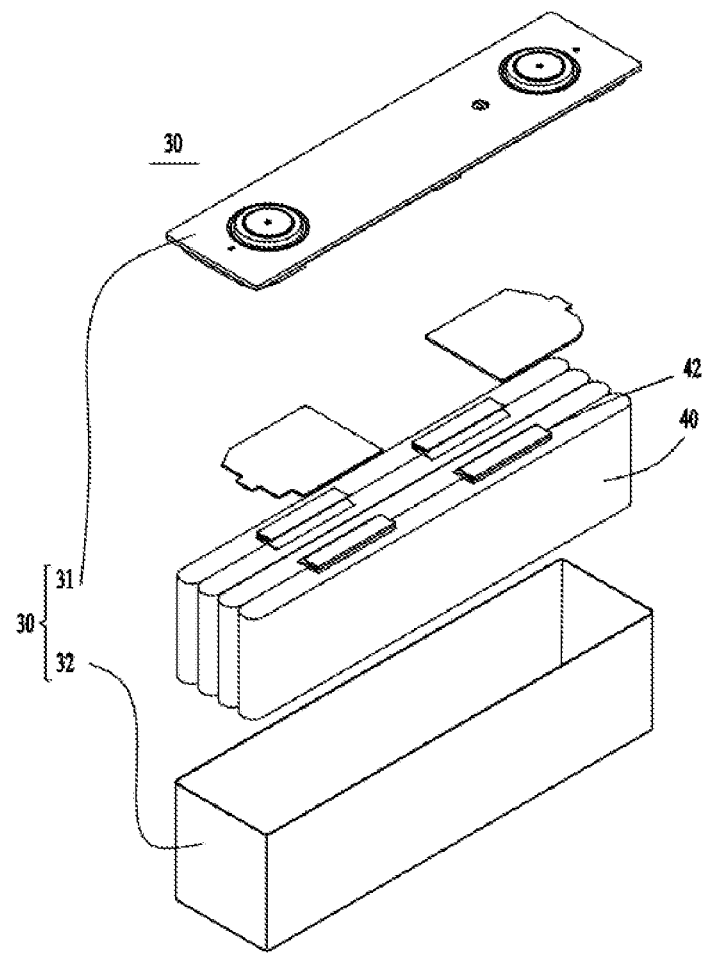
FIG. 6 is an exploded view of a secondary battery shown in FIG. 5 according to some embodiments of this application.

Referring to FIG. 4 to FIG. 6, the secondary battery 30 includes a cap assembly 31, a housing 32, and an electrode assembly 40 and an electrolytic solution that are accommodated in the housing 32. The electrode assembly 40 includes a positive electrode plate 41, a negative electrode plate, and a separator. The positive electrode plate 41 or the negative electrode plate includes a tab 42. During charging and discharging of the secondary battery 30, intercalation and deintercalation of active ions occur back and forth between the positive electrode plate 41 and the negative electrode plate. The electrolyte serves to conduct ions between the positive electrode plate 41 and the negative electrode plate. Disposed between the positive electrode plate 41 and the negative electrode plate, the separator mainly serves to prevent a short circuit between the positive electrode plate and the negative electrode plate, and is penetrable by ions. Specifically, the secondary battery 30 may be a jelly-roll or stacked battery, exemplarily but without being limited to, one of a lithium-ion secondary battery, a lithium primary battery, a sodium-ion battery, or a magnesium-ion battery.

The positive electrode plate 41 includes the positive current collector 50 described in the embodiment in the first aspect of this application. The secondary battery 30 according to this embodiment of this application employs the positive current collector 50 described in the first aspect of this application, and therefore, achieves higher welding performance than a conventional secondary battery.

The shape of the secondary battery is not limited in this application, and may be cylindrical, prismatic or any other shape. FIG. 5 shows a prismatic secondary battery 30 as an example.

In some embodiments, referring to FIG. 6, the outer package may include a housing 32 and a cap assembly 31. The housing 32 may include a bottom plate and a side plate connected to the bottom plates. The bottom plate and the side plates close in to form an accommodation cavity. An opening that communicates with the accommodation cavity is made on the housing 32. The cap assembly 31 can fit and cover the opening to close the accommodation cavity. The positive electrode plate 41, the negative electrode plate, and the separator may be wound or stacked to form the electrode assembly 40. The electrode assembly 40 is packaged in the accommodation cavity. The electrolytic solution serves a function of infiltration in the electrode assembly 40. The number of electrode assemblies 40 in a secondary battery 30 may be one or more, and may be selected by a person skilled in the art as actually required.

In some embodiments, the secondary battery 30 may be assembled into a battery module. The battery module may include one or more secondary batteries, and the specific number of secondary batteries 30 in a battery module may be selected by a person skilled in the art depending on the application scenario and capacity of the battery module.

Figure 7:
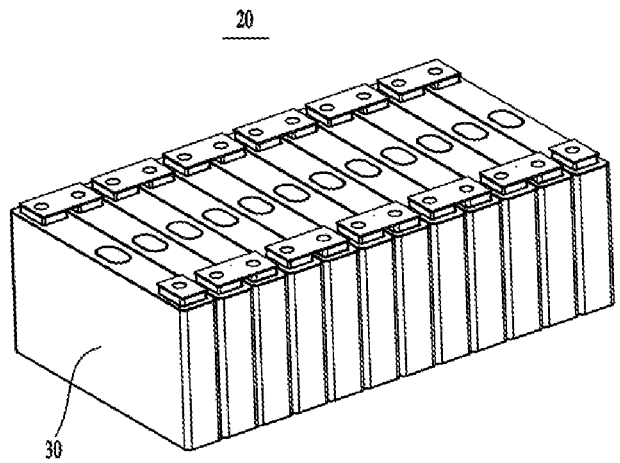
FIG. 7 is a schematic structural diagram of a battery module according to some embodiments of this application.

FIG. 7 shows a battery module 20 as an example. Referring to FIG. 7, in the battery module 20, a plurality of secondary batteries 30 may be arranged sequentially along a length direction of the battery module 20. Alternatively, the secondary batteries may be arranged in any other manner. Further, the plurality of secondary batteries 30 may be fixed by a fastener.

Optionally, the battery module 20 may further include a shell that provides an accommodation space. The plurality of secondary batteries 30 are accommodated in the accommodation space.

In some embodiments, the battery modules 20 may be assembled into a battery pack. The battery pack may include one or more battery modules 20, and the specific number of battery modules in a battery pack may be selected by a person skilled in the art depending on the application scenario and capacity of the battery pack.

Figure 8:
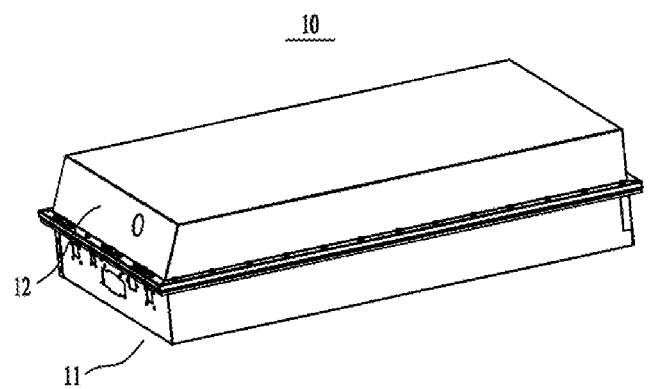
FIG. 8 is a schematic structural diagram of a battery pack according to some embodiments of this application.
Figure 9:
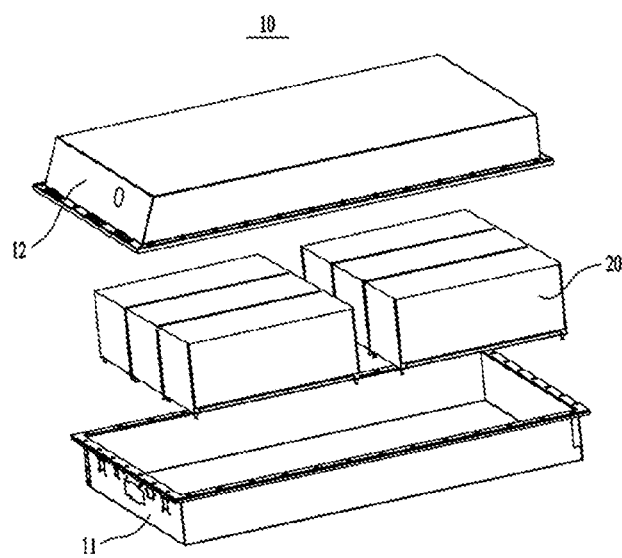
FIG. 9 is an exploded view of a battery pack shown in FIG. 8 according to some embodiments of this application.

FIG. 8 and FIG. 9 show a battery pack as an example. Referring to FIG. 8 and FIG. 9, the battery pack 10 may include a battery box and a plurality of battery modules 20 disposed in the battery box. The battery box includes an upper box 12 and a lower box 11. The upper box 12 fits the lower box 11 to form a closed space for accommodating the battery modules 20. The plurality of battery modules 20 may be arranged in the battery box in any manner.

Figure 10:
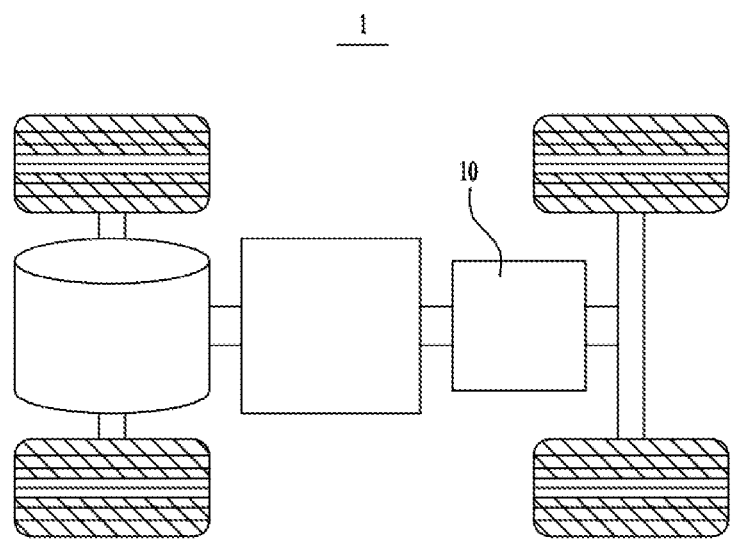
FIG. 10 is a schematic structural diagram of an electrical device according to some embodiments of this application.

In addition, this application further provides an electrical device. Referring to FIG. 10, the electrical device 1 includes at least one of the secondary battery 30, the battery module 20, or the battery pack 10 according to this application. The secondary battery 30, the battery module 20, or the battery pack 10 may be used as a power supply of the electrical device 1, or used as an energy storage unit of the electrical device 1. The electrical device 1 may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery 30, the battery module 20, or the battery pack 10 may be selected for the electrical device 1 depending on application requirements of the electrical device.

FIG. 10 shows an electrical device as an example. The electrical device 1 may be battery electric vehicle, a hybrid electric vehicle, a plug-in hybrid electric vehicle, or the like. To meet the requirements of the electrical device 1 on a high power and a high energy density of the secondary battery 30, a battery pack or a battery module may be employed.

In another example, the device may be a mobile phone, a tablet computer, a notebook computer, or the like. The device is generally required to be thin and light, and may use the secondary battery 30 as a power supply.

EMBODIMENTS

The following describes embodiments of this application. The embodiments described below are exemplary, and are merely intended to construe this application but not to limit this application. In a case that no specific technique or condition is specified in an embodiment, the techniques or conditions described in the literature in this field or described in the instruction manual of the product may apply. A reagent or instrument used herein without specifying the manufacturer is a conventional product that is commercially available in the market.

Embodiment 1

1. Preparing a Positive Current Collector

Selecting a 6 μm-thick PET support layer (with a melting point of 260° C.), cleaning the surface of the support layer, placing the surface-cleaned support layer into a vacuum chamber, and melting and vaporizing an aluminum filament and a doping metal in a metal vaporizing chamber at a high temperature of 550° C. to 1500° C. Cooling the vaporized metal through a cooling system in the vacuum chamber so that the metal is deposited on both surfaces of the support layer to form a conductive layer. The aluminum filament and the doping metal includes several melting units arranged along the width direction and controlled independently (the melting units include an evaporation boat, a filament feeding mechanism, and a heating current circuit). By controlling the melting units, a first metal portion and a second metal portion of the conductive layer can be obtained, where the first metal portion includes 2 wt % silicon and 98 wt % aluminum, and the second metal portion is aluminum. The thickness of the first metal portion is 800 nm, the thickness of the second metal portion is 800 nm, and the ratio of the thickness of the first metal portion to the thickness of the second metal portion is 1. The first metal portion includes a first sublayer, a second sublayer, and a third sublayer; the first sublayer is aluminum, and the melting point of the first sublayer is 660° C.; the second sublayer includes 0.5 wt % silicon and 99.5 wt % aluminum, and the melting point of the second sublayer is 654° C.; and, the third sublayer includes 1.5 wt % silicon and 98.5 wt % aluminum, and the melting point of the third sublayer is 636° C. The melting point of the first metal portion is 645° C.

Preparing Sublayers

Each sublayer is prepared through a plurality of evaporation processes. The amount of a sublayer deposited at a single time is controlled by regulating the travel speed (300 m/min) of the support layer and the parameters (power, 380 V voltage) of the evaporation source (the thickness deposited at a single time is approximately 50 nm). Specifically, in the first 6 evaporation processes of the support layer, the power is set to 7.5 KW for the aluminum melting unit, and is set to 15.7 KW for the silicon melting unit, so as to prepare and deposit a third sublayer with a silicon doping percent of 1.5% and a total thickness of 300 nm. In the subsequent 6 evaporation processes, the power is set 7.5 KW for the aluminum melting unit, and is set to 12.5 KW for the silicon melting unit, so as to prepare and deposit a second sublayer with a silicon doping percent of 0.5% and a total thickness of 300 nm. In the last 4 evaporation processes, a power of 7.5 KW is maintained for the melting unit, the heating power for the silicon melting unit is turned off, so as to prepare and deposit a first sub-layer of pure aluminum with a total thickness of 200 nm.

2. Preparing a Positive Electrode Plate

Stirring and mixing the positive active material $LiNi_{1/3}Co_{1/3}Mn_{1/3}O_2$ ($NCM_{333}$), conductive carbon black, and polyvinylidene difluoride (PVDF) as a binder at a weight ratio of 93:2:5 thoroughly in an appropriate amount of N-methyl-pyrrolidone (NMP) solvent to form a homogeneous positive slurry. Coating a surface of the positive current collector with the positive slurry, and performing steps such as drying to obtain a positive electrode plate.

3. Conventional Negative Current Collector

Adopting a copper foil 8 μm thick.

4. Preparing a Conventional Negative Electrode Plate

Stirring and mixing graphite as a negative active material, conductive carbon black, sodium carboxymethyl cellulose (CMC) as a thickener, styrene butadiene rubber (SBR) as a binder at a weight ratio of 96.5:1.0:1.0:1.5 thoroughly in an appropriate amount of deionized water to form a homogeneous negative slurry, coating the negative current collector with the slurry, and performing steps such as drying to obtain a negative electrode plate.

5. Separator

Adopting a PP thin film.

6. Preparing an Electrolytic Solution

Mixing ethylene carbonate (EC) and ethyl methyl carbonate (EMC) at a volume ratio of 3:7 homogeneously to obtain an organic solvent, and then dissolving 1 mol/L $LiPF_6$ in the organic solvent evenly.

7. Preparing a Secondary Battery

Stacking the positive electrode plate, the separator, and the negative electrode plate in sequence, then winding them into an electrode assembly, and putting the electrode assembly into a packaging shell. Injecting the electrolytic solution into the electrode assembly, and then performing steps such as sealing, standing, hot and cold pressing, and chemical formation to obtain a secondary battery.

Embodiment 2

Differences from Embodiment 1 are: The first metal portion includes a first sublayer, a second sublayer, and a third sublayer; the melting point of the first sublayer is 660° C., the melting point of the second sublayer is 630° C., the melting point of the third sublayer is 660° C., and the melting point of the support layer is 260° C.

Embodiment 3

Differences from Embodiment 1 are: The first metal portion includes a first sublayer, a second sublayer, and a third sublayer; the melting point of the first sublayer is 650° C., the melting point of the second sublayer is 630° C., the melting point of the third sublayer is 570° C., and the melting point of the support layer is 260° C.

Embodiment 4

Differences from Embodiment 1 are: The first metal portion includes a first sublayer, a second sublayer, and a third sublayer; the melting point of the first sublayer is 650° C., the melting point of the second sublayer is 630° C., the melting point of the third sublayer is 540° C., and the melting point of the support layer is 400° C.

Embodiment 5

Differences from Embodiment 1 are: The first metal portion includes a first sublayer, a second sublayer, and a third sublayer; the melting point of the first sublayer is 650°

C., the melting point of the second sublayer is 630° C., the melting point of the third sublayer is 600° C., and the melting point of the support layer is 65° C.

Embodiment 6

Differences from Embodiment 1 are: The first metal portion includes a first sublayer, a second sublayer, and a third sublayer; the melting point of the first sublayer is 650° C., the melting point of the second sublayer is 630° C., the melting point of the third sublayer is 540° C., and the melting point of the support layer is 260° C.

Embodiment 7

Differences from Embodiment 1 are: The first metal portion includes a first sublayer, a second sublayer, and a third sublayer; the melting point of the first sublayer is 780° C., the melting point of the second sublayer is 650° C., the melting point of the third sublayer is 600° C., and the melting point of the support layer is 260° C.

Embodiment 8

Differences from Embodiment 1 are: The first metal portion includes a first sublayer, a second sublayer, and a third sublayer; the melting point of the first sublayer is 650° C., the melting point of the second sublayer is 630° C., the melting point of the third sublayer is 540° C., and the melting point of the support layer is 450° C.

Embodiment 9

Differences from Embodiment 1 are: The first metal portion includes a first sublayer, a second sublayer, and a third sublayer; the melting point of the first sublayer is 660° C., the melting point of the second sublayer is 600° C., the melting point of the third sublayer is 580° C., and the melting point of the support layer is 260° C.

Embodiment 10

Differences from Embodiment 1 are: The first metal portion includes a first sublayer, a second sublayer, and a third sublayer; the melting point of the first sublayer is 660° C., the melting point of the second sublayer is 650° C., the melting point of the third sublayer is 540° C., and the melting point of the support layer is 260° C.

Embodiment 11

A difference from Embodiment 1 is: The first metal portion includes 0.5 wt % silicon and 99.5 wt % aluminum.

Embodiment 12

A difference from Embodiment 1 is: The first metal portion includes 7 wt % silicon and 93 wt % aluminum.

Embodiment 13

A difference from Embodiment 1 is: The first metal portion includes 10 wt % silicon and 90 wt % aluminum.

Embodiment 14

Differences from Embodiment 1 are: The support layer includes 3 wt % tin and 97 wt % PET; and $D_{50}$ of the tin is 3 μm.

Embodiment 15

Differences from Embodiment 1 are: The support layer includes 5 wt % tin and 95 wt % PET; and $D_{50}$ of the tin is 3 μm.

Embodiment 16

Differences from Embodiment 1 are: The support layer includes 10 wt % tin and 90 wt % PET; and $D_{50}$ of the tin is 3 μm.

Embodiment 17

Differences from Embodiment 1 are: The support layer includes 5 wt % tin and 95 wt % PET; and $D_{50}$ of the tin is 5 μm.

Embodiment 18

Differences from Embodiment 1 are: The support layer includes 5 wt % tin and 95 wt % PET; and $D_{50}$ of the tin is 3 μm.

Embodiment 19

Differences from Embodiment 1 are: The support layer includes 5 wt % tin and 95 wt % PET; and $D_{50}$ of the tin is 1 μm.

Embodiment 20

Differences from Embodiment 1 are: The first metal portion includes 99 wt % aluminum and 1 wt % nickel, and the support layer is made of PI.

Embodiment 21

Differences from Embodiment 1 are: The first metal portion includes 99 wt % aluminum and 1 wt % nickel, and the support layer is made of PE.

Embodiment 22

Differences from Embodiment 1 are: The first metal portion includes 92 wt % aluminum and 8 wt % copper, and the support layer is made of PI.

Embodiment 23

Differences from Embodiment 1 are: The first metal portion includes 92 wt % aluminum and 8 wt % copper, and the support layer is made of PE.

Embodiment 24

Differences from Embodiment 1 are: The first metal portion includes 93 wt % aluminum and 7 wt % silicon, and the support layer is made of PP.

Embodiment 25

Differences from Embodiment 1 are: The first metal portion includes 93 wt % aluminum and 7 wt % silicon, and the support layer is made of PET.

Embodiment 26

Differences from Embodiment 1 are: The first metal portion includes 92 wt % aluminum and 8 wt % copper, and the support layer is made of PP.

Embodiment 27

Differences from Embodiment 1 are: The first metal portion includes 92 wt % aluminum and 8 wt % copper, and the support layer is made of PET.

Embodiment 28

Differences from Embodiment 1 are: The first metal portion includes 90 wt % aluminum and 10 wt % magnesium, and the support layer is made of PP.

Embodiment 29

Differences from Embodiment 1 are: The thickness of the first metal portion is 810 nm, and the thickness of the second metal portion is 800 nm.

Embodiment 30

Differences from Embodiment 1 are: The thickness of the first metal portion is 1200 nm, and the thickness of the second metal portion is 800 nm.

Embodiment 31

Differences from Embodiment 1 are: The thickness of the first metal portion is 2400 nm, and the thickness of the second metal portion is 800 nm.

Embodiment 32

Differences from Embodiment 1 are: The thickness of the first metal portion is 900 nm, and the thickness of the second metal portion is 800 nm.

Embodiment 33

Differences from Embodiment 1 are: The thickness of the first metal portion is 3200 nm, and the thickness of the second metal portion is 800 nm.

Embodiment 34

Differences from Embodiment 1 are: The first metal portion includes 0.5 wt % tin and 99.5 wt % aluminum, a protection layer is disposed on the surface of the first metal portion, and the thickness $D_4$ of the protection layer is 5.5 nm.

Method for forming the protection layer: Performing vapor deposition, in-situ formation, or coating to form a protection layer on a surface that is of the conductive layer and that is back from the support layer, where the conductive layer exists on a surface of the current collector.

Embodiment 35

Differences from Embodiment 1 are: The first metal portion includes 2 wt % tin and 98 wt % aluminum, a protection layer is disposed on the surface of the first metal portion, and the thickness $D_4$ of the protection layer is 7 nm.

Method for forming the protection layer: Performing vapor deposition, in-situ formation, or coating to form a protection layer on a surface that is of the conductive layer and that is back from the support layer, where the conductive layer exists on a surface of the current collector.

Embodiment 36

Differences from Embodiment 1 are: The first metal portion includes 7 wt % tin and 93 wt % aluminum, a protection layer is disposed on the surface of the first metal portion, and the thickness $D_4$ of the protection layer is 12 nm.

Method for forming the protection layer: Performing vapor deposition, in-situ formation, or coating to form a protection layer on a surface that is of the conductive layer and that is back from the support layer, where the conductive layer exists on a surface of the current collector.

Embodiment 37

Differences from Embodiment 1 are: The first metal portion includes 10 wt % tin and 90 wt % aluminum, a protection layer is disposed on the surface of the first metal portion, and the thickness $D_4$ of the protection layer is 15 nm.

Method for forming the protection layer: Performing vapor deposition, in-situ formation, or coating to form a protection layer on a surface that is of the conductive layer and that is back from the support layer, where the conductive layer exists on a surface of the current collector.

Embodiment 38

Differences from Embodiment 1 are: The first metal portion includes 2 wt % tin and 98 wt % aluminum, a protection layer is disposed on the surface of the first metal portion, and the thickness $D_4$ of the protection layer is 20 nm.

Method for forming the protection layer: Performing vapor deposition, in-situ formation, or coating to form a protection layer on a surface that is of the conductive layer and that is back from the support layer, where the conductive layer exists on a surface of the current collector.

Embodiment 39

Differences from Embodiment 1 are: A protection layer is disposed on the surface of the first metal portion, and the thickness $D_4$ of the protection layer is 7 nm.

Method for forming the protection layer: Performing vapor deposition, in-situ formation, or coating to form a protection layer on a surface that is of the conductive layer and that is back from the support layer, where the conductive layer exists on a surface of the current collector.

Comparative Embodiment 1

Differences from Embodiment 1 are: The first metal portion includes a first sublayer, a second sublayer, and a third sublayer; the melting point of the first sublayer is 650° C., the melting point of the second sublayer is 650° C., the melting point of the third sublayer is 600° C., and the melting point of the support layer is 260° C.

Comparative Embodiment 2

Differences from Embodiment 1 are: The first metal portion includes a first sublayer, a second sublayer, and a third sublayer; the melting point of the first sublayer is 540° C., the melting point of the second sublayer is 650° C., the melting point of the third sublayer is 600° C., and the melting point of the support layer is 260° C.

Comparative Embodiment 3

Differences from Embodiment 1 are: The first metal portion includes a first sublayer, a second sublayer, and a third sublayer; the melting point of the first sublayer is 660° C., the melting point of the second sublayer is 660° C., the melting point of the third sublayer is 540° C., and the melting point of the support layer is 260° C.

Comparative Embodiment 4

Differences from Embodiment 1 are: The first metal portion includes a first sublayer, a second sublayer, and a third sublayer; the melting point of the first sublayer is 660° C., the melting point of the second sublayer is 600° C., the melting point of the third sublayer is 660° C., and the melting point of the support layer is 260° C.

Comparative Embodiment 5

Differences from Embodiment 1 are: The first metal portion includes a first sublayer, a second sublayer, and a third sublayer; the melting point of the first sublayer is 650° C., the melting point of the second sublayer is 630° C., the melting point of the third sublayer is 660° C., and the melting point of the support layer is 65° C.

Comparative Embodiment 6

Differences from Embodiment 1 are: The first metal portion includes a first sublayer, a second sublayer, and a third sublayer; the melting point of the first sublayer is 660° C., the melting point of the second sublayer is 660° C., the melting point of the third sublayer is 660° C., and the melting point of the support layer is 260° C.

Comparative Embodiment 7

A difference from Embodiment 1 is: The first metal portion is made of aluminum.

Comparative Embodiment 8

Differences from Embodiment 1 are: The first metal portion is made of aluminum, and the support layer is made of PE.

The preparation method in the comparative embodiments is similar to that in the embodiments, and different product parameters are shown in Table 1 to Table 14.

II. Methods for Testing Performance Parameters

1. Testing Parameters of the Positive Electrode Plate (1) Testing the Melting Points of the First Metal Portion, the First Sublayer, the Second Sublayer, the Third Sublayer, and the Support Layer Testing the melting points of the first metal portion, the first sublayer, the second sublayer, the third sublayer, and the support layer by using a differential scanning calorimeter (STA449 F3, manufactured by NETZSCH Instruments, Germany). Specifically, weighing out 30 mg to 50 mg of the first metal part, the first sublayer, the second sublayer, the third sublayer, and the support layer separately to serve as specimens, putting the specimens into a platinum crucible, passing nitrogen gas into the crucible to form a protection atmosphere, where the nitrogen flow rate is set to 20 mL/min. Heating up at a heating rate of 10° C./min until a maximum temperature of 1000° C., and reading a peak value of a maximum endothermic peak, where the readout is the melting point of the first metal portion, the first sublayer, the second sublayer, the third sublayer, and the support layer, separately.

(2) Testing the Thickness of the First Metal Portion, the Second Metal Portion, and the Protection Layer Preparing cross-sectional specimens of the first metal portion, the second metal portion, the protection layer separately by using argon ion etching equipment (IB19500CP, manufactured by JEOL Ltd.), wherein the etching voltage is 7.5 KV, and the etching duration is 20 minutes. Magnifying the specimens by a factor of 1000 to 5000 by using a scanning electron microscope (Sigma300, manufactured by Carl Zeiss AG), observing the secondary electron phase morphology of the cross section of the specimens, and measuring the thickness of the first metal portion, the second metal portion, and the protection layer separately, where the working voltage is 10 KV, the working distance is 4.5 mm, and the minimum resolution is on a nanometer scale.

(2) Testing the Resistance of the Positive Electrode Plate

The method for measuring the resistance of the positive electrode plate is: Using an RTS-9 dual-configuration four-point probe in the following test environment: normal temperature 23±2° C.; relative humidity ≤65%. Cleaning the surface of the positive electrode plate before the measurement, placing the positive electrode plate on a test bed horizontally, leaving the four probes to be in contact with the surface of the positive electrode plate, and then calibrating a current range of the material in an automatic test mode, and measuring the resistance of the positive electrode plate within a current range of 100 μm to 100 mA.

(3) Testing the Welding Tension at a Weld Between the Positive Electrode Plate and the Tab Measuring the welding tension at a weld between the positive electrode plate and the tab by using a GoTech tensile testing machine. Cutting out a 30 mm×60 mm specimen from a weld region between the positive electrode plate and the tab. Stretching the specimen at a speed of 5 mm/min, and reading a maximum force value when the weld breaks off. Selecting 32 specimens randomly for testing. Evaluating the mechanical bonding effect of the welding by calculating a mean value of the welding tension of the specimens. A formula for calculating the mean value of the welding tension is:

mean value of the welding tension=sum of the welding tension values of 32 specimens/32.

(4) Testing the Defect Rate of Welding

Collecting the internal resistance values of 1000 secondary batteries, comparing them with a standard value (the standard value is less than or equal to 1.1 mΩ for secondary batteries of 60 Ah), and defining the batteries beyond the standard value as defective items. Disassembling the defective items, finding the reasons for the substandard internal resistance, and counting the number of defective items caused by poor welding. The defect rate of welding is defined as follows:

defect rate of welding=number of poor-welding-induced defective items/1000×100%.

(5) Testing $D_{50}$ of the Metal Material

Obtaining $D_{50}$ by measuring the particle size distribution of the metal material with a laser diffraction particle size analyzer (Malvern Mastersizer 3000) based on a particle size distribution laser diffraction method GB/T19077-2016.

2. Testing Parameters of the Battery (1) Testing the Volumetric Energy Density of the Battery Charging a prepared secondary battery initially at a 1 C-rate current under a normal temperature in a constant-current and constant-voltage manner, where the cut-off voltage is 4.2 V and the cut-off current is 0.05 C. Discharging the battery at 1 C-rate current, where the discharge cut-off voltage is 2.8 V. Recording a first-cycle discharge capacity Cb and a discharge plateau voltage U of the secondary battery.

Measuring the length (L), width (W), and height (H) of the battery by using a flexible rule or steel rule with a minimum graduation value of 1 mm, and then calculating the volumetric energy density of the secondary battery by the following formula:

volumetric energy density=$Cb \times U/(L \times W \times H)$.

(2) Testing the Cycle Performance of the Battery

Testing the cycle life: Fully charging the prepared secondary battery at a 1 C rate and fully discharging the battery at a 1 C rate under a normal temperature for a plurality of cycles until the capacity of the secondary battery fades to 80% of the initial capacity, and then stopping the test, and recording the number of cycles.

III. Test Results of Embodiments and Comparative Embodiments

The secondary batteries described in the embodiments and the comparative embodiments are prepared according to the foregoing methods, and performance parameters of the secondary batteries are measured. The test results are shown in Table 1 to Table 14.

It needs to be noted that Embodiment P corresponds to a positive current collector P, a positive electrode plate P, and a battery P. For example, Embodiment 1 corresponds to the positive current collector 1, the positive electrode plate 1, and the battery 1. Comparative Embodiment P corresponds to a comparative positive current collector P, a comparative positive electrode plate P, and a comparative battery P. For example, Comparative Embodiment 1 corresponds to the comparative positive current collector 1, the comparative positive electrode plate 1, and the comparative battery 1.

TABLE 1

| Serial number of positive current collector | Conductive layer | | | Melting point of support layer (° C.) | $R_1$ | $R_2$ | $R_3$ |
|---|---|---|---|---|---|---|---|
| | Melting point of first sublayer (° C.) | Melting point of second sublayer (° C.) | Melting point of third sublayer (° C.) | | | | |
| Positive current collector 1 | 660 | 654 | 636 | 260 | 1.01 | 1.03 | 2.45 |
| Positive current collector 2 | 660 | 630 | 600 | 260 | 1.05 | 1.05 | 2.31 |
| Positive current collector 3 | 650 | 630 | 570 | 260 | 1.03 | 1.11 | 2.19 |
| Positive current collector 4 | 650 | 630 | 540 | 400 | 1.03 | 1.17 | 1.35 |
| Positive current collector 5 | 650 | 630 | 600 | 65 | 1.03 | 1.05 | 9.23 |
| Positive current collector 6 | 650 | 630 | 540 | 260 | 1.03 | 1.17 | 2.08 |
| Positive current collector 7 | 780 | 650 | 600 | 260 | 1.2 | 1.08 | 2.31 |
| Positive current collector 8 | 650 | 630 | 540 | 450 | 1.03 | 1.17 | 1.20 |
| Positive current collector 9 | 660 | 600 | 580 | 260 | 1.1 | 1.04 | 2.23 |
| Positive current collector 10 | 660 | 650 | 540 | 260 | 1.01 | 1.2 | 2.08 |
| Comparative positive current collector 1 | 650 | 650 | 600 | 260 | 1.00 | 1.08 | 2.31 |
| Comparative positive current collector 2 | 540 | 650 | 600 | 260 | 0.83 | 1.08 | 2.31 |
| Comparative positive current collector 3 | 660 | 660 | 540 | 260 | 1.00 | 1.22 | 2.08 |
| Comparative positive current collector 4 | 660 | 600 | 660 | 260 | 1.10 | 0.91 | 2.54 |
| Comparative positive current collector 5 | 650 | 630 | 660 | 65 | 1.03 | 0.95 | 10.15 |
| Comparative positive current collector 6 | 660 | 660 | 660 | 260 | 1 | 1 | 2.54 |

TABLE 2

| Battery number | Positive electrode plate | | Negative electrode plate Conventional negative electrode plate | Welding tension of electrode plate (N) | Electrode plate resistance (mΩ) | Defect rate of welding |
|---|---|---|---|---|---|---|
| | Serial number of positive current collector | Serial number of positive electrode plate | | | | |
| Battery 1 | Positive current collector 1 | Positive electrode plate 1 | Conventional negative electrode plate | 28.2 | 66.3 | 1.6% |

TABLE 2-continued

| | | Positive electrode plate | | | | |
|---|---|---|---|---|---|---|
| Battery number | Serial number of positive current collector | Serial number of positive electrode plate | Negative electrode plate Conventional negative electrode plate | Welding tension of electrode plate (N) | Electrode plate resistance (mΩ) | Defect rate of welding |
| Battery 2 | Positive current collector 2 | Positive electrode plate 2 | Conventional negative electrode plate | 30.4 | 63.8 | 1.0% |
| Battery 3 | Positive current collector 3 | Positive electrode plate 3 | Conventional negative electrode plate | 31.6 | 62.6 | 0.8% |
| Battery 4 | Positive current collector 4 | Positive electrode plate 4 | Conventional negative electrode plate | 32.3 | 61.8 | 1.0% |
| Battery 5 | Positive current collector 5 | Positive electrode plate 5 | Conventional negative electrode plate | 33.5 | 60.3 | 0.8% |
| Battery 6 | Positive current collector 6 | Positive electrode plate 6 | Conventional negative electrode plate | 37.8 | 56 | 0.6% |
| Battery 7 | Positive current collector 7 | Positive electrode plate 7 | Conventional negative electrode plate | 29.4 | 66.9 | 2.1% |
| Battery 8 | Positive current collector 8 | Positive electrode plate 8 | Conventional negative electrode plate | 26.4 | 70.5 | 2.5% |
| Battery 9 | Positive current collector 9 | Positive electrode plate 9 | Conventional negative electrode plate | 34.7 | 59.5 | 0.9% |
| Battery 10 | Positive current collector 10 | Positive electrode plate 10 | Conventional negative electrode plate | 30.4 | 64.1 | 1.2% |
| Comparative battery 1 | Comparative positive current collector 1 | Comparative positive electrode plate 1 | Conventional negative electrode plate | 25.6 | 67.3 | 2.8% |
| Comparative battery 2 | Comparative positive current collector 2 | Comparative positive electrode plate 2 | Conventional negative electrode plate | 21.3 | 74.6 | 3.1% |
| Comparative battery 3 | Comparative positive current collector 3 | Comparative positive electrode plate 3 | Conventional negative electrode plate | 27.6 | 66.3 | 2.8% |
| Comparative battery 4 | Comparative positive current collector 4 | Comparative positive electrode plate 4 | Conventional negative electrode plate | 26.7 | 69.8 | 3.0% |
| Comparative battery 5 | Comparative positive current collector 5 | Comparative positive electrode plate 5 | Conventional negative electrode plate | 25.8 | 77.5 | 6.3% |
| Comparative battery 6 | Comparative positive current collector 6 | Comparative positive electrode plate 6 | Conventional negative electrode plate | 25.9 | 68.5 | 2.8% |

As can be seen from Table 1 and Table 2, the first metal portion of the battery 1 to the battery 10 includes three sublayers, each having a different melting point. The melting points show a tendency to change stepwise, thereby significantly improving the welding performance of the first metal portion. The defect rate of welding is relatively low. Although the first metal portion of the comparative battery 1 to the comparative battery 6 includes three sublayers, three melting points of the three sublayers do not show a tendency to change stepwise. The welding reliability of the first metal portion is relatively poor, and the defect rate of welding is relatively high.

TABLE 3

| Serial number of positive collector current | Conductive layer | | | | | |
|---|---|---|---|---|---|---|
| | First metal portion | | | | | |
| | Type of doping element | $W_1$/ % | Metal matrix element | $W_2$/ % | Second metal portion | Support layer |
| Positive current collector 1 | Silicon | 2 | Aluminum | 98 | Aluminum | PET |
| Positive current collector 11 | Silicon | 0.5 | Aluminum | 99.5 | Aluminum | PET |

TABLE 3-continued

| Serial number of positive collector current | Conductive layer | | | | | Support layer |
|---|---|---|---|---|---|---|
| | First metal portion | | | | Second metal portion | |
| | Type of doping element | $W_1$/% | Metal matrix element | $W_2$/% | | |
| Positive current collector 12 | Silicon | 7 | Aluminum | 93 | Aluminum | PET |
| Positive current collector 13 | Silicon | 10 | Aluminum | 90 | Aluminum | PET |
| Comparative positive current collector 7 | None | 0 | Aluminum | 100 | Aluminum | PET |

TABLE 4

| Battery number | Serial number of positive current collector | Serial number of positive electrode plate | Negative electrode plate | Welding tension of electrode plate (N) | Electrode plate resistance (mΩ) | Defect rate of welding |
|---|---|---|---|---|---|---|
| Battery 1 | Positive current collector 1 | Positive electrode plate 1 | Conventional negative electrode plate | 28.2 | 66.3 | 1.6% |
| Battery 11 | Positive current collector 11 | Positive electrode plate 11 | Conventional negative electrode plate | 29.4 | 64.8 | 1.9% |
| Battery 12 | Positive current collector 12 | Positive electrode plate 12 | Conventional negative electrode plate | 33.7 | 60.5 | 0.9% |
| Battery 13 | Positive current collector 13 | Positive electrode plate 13 | Conventional negative electrode plate | 32.5 | 63.2 | 1.2% |
| Comparative battery 7 | Comparative positive current collector 7 | Comparative positive electrode plate 1 | Conventional negative electrode plate | 25.9 | 68.5 | 2.8% |

As can be seen from Table 3 and Table 4, the conductive layer of the comparative battery 7 is made of aluminum foil, the welding tension of the electrode plate is relatively small, the welding reliability is relatively poor, and the defect rate of welding is relatively high. The first metal portion of the conductive layers employed by the battery 1, and the battery 11 to the battery 13 is doped with a doping metal. The welding tension of the electrode plate is greater than the welding tension of the aluminum foil to some extent.

TABLE 5

| Serial number of positive current collector | Support layer | | | | |
|---|---|---|---|---|---|
| | Metal material | Doping percent of metal material (%) | Polymer material | Mass percent of polymer material (%) | $D_{50}$ (μm) |
| Positive current collector 14 | Tin | 3 | PET | 97 | 3 |
| Positive current collector 15 | Tin | 5 | PET | 95 | 3 |
| Positive current collector 16 | Tin | 10 | PET | 90 | 3 |

TABLE 6

| Battery number | Serial number of positive current collector | Serial number of positive electrode plate | Negative electrode plate Conventional negative electrode plate | Welding tension of electrode plate (N) | Electrode plate resistance (mΩ) | Defect rate of welding |
|---|---|---|---|---|---|---|
| Battery 14 | Positive current collector 14 | Positive electrode plate 14 | Conventional negative electrode plate | 28.3 | 63.7 | 1.0% |
| Battery 15 | Positive current collector 15 | Positive electrode plate 15 | Conventional negative electrode plate | 32.6 | 59.4 | 0.8% |
| Battery 16 | Positive current collector 16 | Positive electrode plate 16 | Conventional negative electrode plate | 31.4 | 62.1 | 1.1% |

As can be seen from Table 5 and Table 6, compared with the battery 1, the battery 14 to the battery 16 effectively improve the welding reliability of the secondary battery and achieve a relatively low defect rate of welding of the secondary battery by adding an appropriate amount of metal material into the polymer material of the support layer.

TABLE 7

| | Support layer | | | | |
|---|---|---|---|---|---|
| Serial number of positive current collector | Metal material | Doping percent of metal material (%) | $D_{50}$ (μm) | Polymer material | Mass percent of polymer material (%) |
| Positive current collector 17 | Tin | 5 | 5 | PET | 95 |
| Positive current collector 18 | Tin | 5 | 3 | PET | 95 |
| Positive current collector 19 | Tin | 5 | 1 | PET | 95 |

TABLE 8

| Battery number | Serial number of positive current collector | Serial number of positive electrode plate | Negative electrode plate Conventional negative electrode plate | Welding tension of electrode plate (N) | Electrode plate resistance (mΩ) | Defect rate of welding |
|---|---|---|---|---|---|---|
| Battery 17 | Positive current collector 17 | Positive electrode plate 17 | Conventional negative electrode plate | 31.3 | 62.1 | 0.9% |
| Battery 18 | Positive current collector 18 | Positive electrode plate 18 | Conventional negative electrode plate | 32.6 | 59.4 | 0.8% |
| Battery 19 | Positive current collector 19 | Positive electrode plate 19 | Conventional negative electrode plate | 33.5 | 60.8 | 0.9% |

As can be seen from Table 7 and Table 8, compared with the battery 1, the battery 17 to the battery 19 effectively improve the welding reliability of the secondary battery and achieve a relatively low defect rate of welding of the secondary battery by adding a metal material of an appropriate particle size into the polymer material of the support layer.

TABLE 9

| | Conductive layer | | Support layer | | |
|---|---|---|---|---|---|
| Serial number of positive current collector | Material of first metal portion | Melting point of first metal portion (° C.) | Material | Melting point (° C.) | $R_4$ |
| Positive current collector 20 | 99 wt % aluminum and 1 wt % nickel | 650 | PI | 400 | 1.63 |
| Positive current collector 21 | 99 wt % aluminum and 1 wt % nickel | 650 | PE | 65 | 10.00 |
| Positive current collector 22 | 92 wt % aluminum and 8 wt % copper | 540 | PI | 400 | 1.35 |
| Positive current collector 23 | 92 wt % aluminum and 8 wt % copper | 540 | PE | 65 | 8.31 |
| Positive current collector 24 | 93 wt % aluminum and 7 wt % silicon | 620 | PP | 160 | 3.88 |

TABLE 9-continued

| | Conductive layer | | Support layer | | |
|---|---|---|---|---|---|
| Serial number of positive current collector | Material of first metal portion | Melting point of first metal portion (°C.) | Material | Melting point (°C.) | $R_4$ |
| Positive current collector 25 | 93 wt % aluminum and 7 wt % silicon | 620 | PET | 260 | 2.38 |
| Positive current collector 26 | 92 wt % aluminum and 8 wt % copper | 540 | PP | 160 | 3.38 |
| Positive current collector 27 | 92 wt % aluminum and 8 wt % copper | 540 | PET | 260 | 2.08 |
| Positive current collector 28 | 90 wt % aluminum and 10 wt % magnesium | 600 | PP | 160 | 3.75 |
| Comparative positive current collector 8 | Aluminum | 660 | PE | 65 | 10.15 |

As can be seen from Table 9 and Table 10, in comparison with the comparative battery 8, when the first metal portion of the battery 20 to the battery 28 is doped with a doping element, the welding performance of the tab is more reliable, and the defect rate of welding is lower. In particular, when the ratio $R_4$ of the melting point of the first metal portion to the melting point of the support layer is 1.35 to 10, the welding reliability of the secondary battery can be effectively improved, and the defect rate of welding of the secondary battery is relatively low.

TABLE 11

| Serial number of positive current collector | Thickness of first metal portion (nm) | Thickness of second metal portion (nm) | A |
|---|---|---|---|
| Positive current collector 29 | 810 | 800 | 1.01 |
| Positive current collector 30 | 1200 | 800 | 1.50 |
| Positive current collector 31 | 2400 | 800 | 3.00 |
| Positive current collector 32 | 900 | 800 | 1.125 |
| Positive current collector 33 | 3200 | 800 | 4.00 |

TABLE 10

| Battery number | Positive electrode plate Serial number of positive current collector | Serial number of positive electrode plate | Negative electrode plate Conventional negative electrode plate | Welding tension of electrode plate (N) | Electrode plate resistance (mΩ) | Defect rate of welding |
|---|---|---|---|---|---|---|
| Battery 20 | Positive current collector 20 | Positive electrode plate 20 | Conventional negative electrode plate | 35.2 | 67.4 | 1.5% |
| Battery 21 | Positive current collector 21 | Positive electrode plate 21 | Conventional negative electrode plate | 26.3 | 68.8 | 1.8% |
| Battery 22 | Positive current collector 22 | Positive electrode plate 22 | Conventional negative electrode plate | 35.9 | 67.2 | 1.4% |
| Battery 23 | Positive current collector 23 | Positive electrode plate 23 | Conventional negative electrode plate | 25.8 | 68.3 | 1.9% |
| Battery 24 | Positive current collector 24 | Positive electrode plate 24 | Conventional negative electrode plate | 30.6 | 65.3 | 0.9% |
| Battery 25 | Positive current collector 25 | Positive electrode plate 25 | Conventional negative electrode plate | 33.2 | 65.8 | 0.8% |
| Battery 26 | Positive current collector 26 | Positive electrode plate 26 | Conventional negative electrode plate | 31.4 | 64.7 | 0.7% |
| Battery 27 | Positive current collector 27 | Positive electrode plate 27 | Conventional negative electrode plate | 34.6 | 64.1 | 0.7% |
| Battery 28 | Positive current collector 28 | Positive electrode plate 28 | Conventional negative electrode plate | 33.7 | 63.2 | 0.6% |
| Comparative battery 8 | Comparative positive current collector 8 | Comparative positive electrode plate 8 | Conventional negative electrode plate | 20.4 | 69.4 | 6.8% |

TABLE 12

| Battery number | Positive electrode plate Serial number of positive current collector | Serial number of positive electrode plate | Negative electrode plate Conventional negative electrode plate | Welding tension of electrode plate (N) | Electrode plate resistance (mΩ) | Defect rate of welding | Energy density of secondary battery (Wh/L) |
|---|---|---|---|---|---|---|---|
| Battery 29 | Positive current collector 29 | Positive electrode plate 29 | Conventional negative electrode plate | 26.3 | 67.3 | 1.6% | 630 |
| Battery 30 | Positive current collector 30 | Positive electrode plate 30 | Conventional negative electrode plate | 30.9 | 62.4 | 1.0% | 627 |
| Battery 31 | Positive current collector 31 | Positive electrode plate 31 | Conventional negative electrode plate | 34.5 | 58.6 | 0.8% | 625 |
| Battery 32 | Positive current collector 32 | Positive electrode plate 32 | Conventional negative electrode plate | 28.9 | 65.5 | 1.5% | 629 |
| Battery 33 | Positive current collector 33 | Positive electrode plate 33 | Conventional negative electrode plate | 35.7 | 58.1 | 0.8% | 618 |

As can be seen from Table 11 and Table 12, compared with the battery 1, the battery 29 to the battery 33 can significantly improve the welding performance of the first metal portion, and ensure a relatively high energy density of the secondary battery. In particular, when the ratio A of the thickness of the first metal portion to the thickness of the second metal portion is 1.01 to 3, the energy density of the secondary battery is relatively high.

TABLE 13

| Serial number of positive current collector | First metal portion Doping element | $W_1$/% | Metal matrix | $W_2$/% | Protection layer $D_4$/nm |
|---|---|---|---|---|---|
| Positive current collector 34 | Tin | 0.5 | Aluminum | 99.5 | 5.5 |
| Positive current collector 35 | Tin | 2 | Aluminum | 98 | 7 |
| Positive current collector 36 | Tin | 7 | Aluminum | 93 | 12 |
| Positive current collector 37 | Tin | 10 | Aluminum | 90 | 15 |
| Positive current collector 38 | Tin | 2 | Aluminum | 98 | 20 |
| Positive current collector 39 | Silicon | 2 | Aluminum | 98 | 7 |
| Positive current collector 1 | Tin | 2 | Aluminum | 98 | 0 |

TABLE 14

| Battery number | Positive electrode plate Serial number of positive current collector | Serial number of positive electrode plate | Negative electrode plate Conventional negative electrode plate | Cycle life (number of cycles) |
|---|---|---|---|---|
| Battery 34 | Positive current collector 34 | Positive electrode plate 34 | Conventional negative electrode plate | 1750 |
| Battery 35 | Positive current collector 35 | Positive electrode plate 35 | Conventional negative electrode plate | 1730 |
| Battery 36 | Positive current collector 36 | Positive electrode plate 36 | Conventional negative electrode plate | 1680 |
| Battery 37 | Positive current collector 37 | Positive electrode plate 37 | Conventional negative electrode plate | 1650 |
| Battery 38 | Positive current collector 38 | Positive electrode plate 38 | Conventional negative electrode plate | 1260 |
| Battery 39 | Positive current collector 39 | Positive electrode plate 39 | Conventional negative electrode plate | 1710 |
| Battery 1 | Positive current collector 1 | Positive electrode plate 1 | Conventional negative electrode plate | 1050 |

As can be seen from Table 13 and Table 14, in comparison with the battery 1, a protection layer disposed on the surface of the conductive layer of the battery 34 to the battery 39 can significantly improve the cycle performance of the battery.

It needs to be noted that this application is not limited to the foregoing embodiments. The foregoing embodiments are merely examples. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A positive current collector, comprising:
   a support layer; and
   a conductive layer located on at least one surface of the support layer, wherein the conductive layer comprises a first metal portion configured to connect to a tab,
   wherein, along a thickness direction of the conductive layer, the first metal portion comprises at least three sublayers, and melting points of the at least three sublayers rise stepwise in ascending order of distance from the support layer.

2. The positive current collector according to claim 1, wherein the first metal portion comprises a metal matrix and a doping element;
   the metal matrix is selected from aluminum or an aluminum-based alloy; and/or
   the doping element is one or more selected from beryllium, calcium, cadmium, cerium, indium, lanthanum, lithium, neodymium, nickel, palladium, praseodymium, samarium, tin, yttrium, ytterbium, zinc, gallium, germanium, silicon, samarium, uranium, magnesium, or copper.

3. The positive current collector according to claim 2, wherein, based on a total mass percent W of the first metal portion being 100%, a mass percent $W_1$ of the doping element is 0.5% to 10%, and a mass percent $W_2$ of the metal matrix is 90% to 99.5%.

4. The positive current collector according to claim 1, wherein the support layer comprises one or more of a polymer material or a polymer-based composite material;
   the polymer material comprises one or more of polyamide, polyimide, polyethylene terephthalate, polybutylene terephthalate, polyethylene naphthalate, polycarbonate, polyethylene, polypropylene, polyphenylene ether, poly(acrylonitrile-co-butadiene-co-styrene), polyvinyl alcohol, polystyrene, polyvinyl chloride, polyvinylidene difluoride, polytetrafluoroethylene, poly(sodium-p-styrenesulfonate), poly acetylene, silicone rubber, polyoxymethylene, polyphenylene oxide, polyphenylene sulfide, polyethylene glycol, polythiaxyl, polyphenyl, polypyrrole, polyaniline, polythiophene, polypyridine, cellulose, starch, protein, epoxy resin, phenol resin, a derivative thereof, a crosslinked polymer thereof, or a copolymer thereof; and
   the polymer-based composite material comprises the polymer material and a metal material.

5. The positive current collector according to claim 4, wherein the metal material comprises one or one of magnesium, calcium, strontium, lead, zinc, tin, antimony, bismuth, silver, or ruthenium.

6. The positive current collector according to claim 4, wherein based on a total mass percent of the polymer-based composite material being 100%, a doping percent of the metal material is less than or equal to 10%; and/or
   $D_{50}$ of the metal material is less than or equal to 5 μm, and optionally, $D_{50}$ of the metal material is 1 μm to 3 μm, wherein $D_{50}$ is a particle diameter measured when a cumulative volume percentage of the metal material reaches 50%, that is, a median diameter in a volume-based particle size distribution.

7. The positive current collector according to claim 4, wherein the doping percent of the metal material falls within a range that is less than or equal to 5%.

8. The positive current collector according to claim 1, wherein
   a ratio of a melting point of the first metal portion to a melting point of the support layer is $R_4$, $1.35 \leq R_4 \leq 10$.

9. The positive current collector according to claim 8, wherein the ratio of a melting point of the first metal portion to a melting point of the support layer is $2.08 \leq R_4 \leq 3.88$.

10. The positive current collector according to claim 1, wherein
    a melting point of the first metal portion is 540° C. to 650° C.; and optionally, the melting point of the first metal portion is 540° C. to 620° C.; and/or
    a melting point of the support layer is 65° C. to 400° C.

11. The positive current collector according to claim 10, wherein the melting point of the support layer is 160° C. to 260° C.

12. The positive current collector according to claim 1, wherein the conductive layer comprises a second metal portion configured to connect to a positive active material layer, and a melting point of the second metal portion is 600° C. to 660° C.

13. The positive current collector according to claim 12, wherein the melting point of the second metal portion is 620° C. to 660° C.

14. The positive current collector according to claim 10, wherein a ratio of a thickness of the first metal portion to a thickness of the second metal portion is A, wherein $1.01 \leq A \leq 3$.

15. The positive current collector according to claim 1, wherein, along the thickness direction of the conductive layer, the first metal portion comprises a first sublayer, a second sublayer, and a third sublayer, the third sublayer is located on a surface of the support layer, the second sublayer is located on a side that is of the third sublayer and that is back from the support layer, and the first sublayer is located on a side that is of the second sublayer and that is back from the support layer,
    the first sublayer comprises a first metal matrix;
    the second sublayer comprises a second metal matrix and a second doping element;
    the third sublayer comprises a third metal matrix and a third doping element
    wherein the first metal matrix, the second metal matrix, and the third metal matrix each are independently selected from aluminum or an aluminum-based alloy; and/or
    the second doping element and the third doping element each are one or more independently selected from beryllium, calcium, cadmium, cerium, indium, lanthanum, lithium, neodymium, nickel, palladium, praseodymium, samarium, tin, yttrium, ytterbium, zinc, gallium, germanium, silicon, samarium, uranium, magnesium, or copper.

16. The positive current collector according to claim 15, wherein the first metal matrix is selected from aluminum;

the second metal matrix is selected from aluminum, the second doping element is one or more selected from calcium, cerium, lanthanum, lithium, neodymium, nickel, palladium, praseodymium, samarium, yttrium, ytterbium, samarium, uranium, or copper, the second doping element is configured to form an intermetallic compound, and the second sublayer is doped with the intermetallic compound; and/or the third metal matrix is selected from aluminum, the third doping element is one or more selected from calcium, cerium, lanthanum, lithium, neodymium, nickel, palladium, praseodymium, samarium, yttrium, ytterbium, samarium, uranium, or copper, the third doping element is configured to form an intermetallic compound, and the third sublayer is doped with the intermetallic compound.

17. The positive current collector according to claim 15, wherein a ratio of a melting point of the first sublayer to a melting point of the second sublayer is $R_1$, wherein $1<R_1 \leq 1.1$;

a ratio of a melting point of the second sublayer to a melting point of the third sublayer is $R_2$, wherein $1<R_2 \leq 1.2$; and/or a ratio of a melting point of the third sublayer to a melting point of the support layer is $R_3$, wherein $1.35 \leq R_3 \leq 9.23$.

18. The positive current collector according to claim 15, wherein a melting point of the first sublayer is 650° C. to 660° C.;

a melting point of the second sublayer is 600° C. to 650° C.; and a melting point of the third sublayer is 540° C. to 600° C.

19. The positive current collector according to claim 1, wherein the positive current collector further comprises a protection layer, and the protection layer is disposed on at least one of two opposite surfaces of the conductive layer in the thickness direction.

* * * * *